(12) United States Patent
Koskinen et al.

(10) Patent No.: US 9,497,636 B2
(45) Date of Patent: Nov. 15, 2016

(54) APPARATUS AND METHOD TO REDUCE INTERFERENCE BETWEEN DISPARATE COMMUNICATION SYSTEMS

(75) Inventors: Jussi-Pekka Koskinen, Oulu (FI); Jarkko T. Koskela, Oulu (FI); Antti-Veikko Piipponen, Vantaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 216 days.

(21) Appl. No.: 14/110,547

(22) PCT Filed: Jan. 23, 2012

(86) PCT No.: PCT/FI2012/050055
§ 371 (c)(1),
(2), (4) Date: Dec. 13, 2013

(87) PCT Pub. No.: WO2012/140314
PCT Pub. Date: Oct. 18, 2012

(65) Prior Publication Data
US 2015/0043363 A1 Feb. 12, 2015

Related U.S. Application Data

(60) Provisional application No. 61/474,019, filed on Apr. 11, 2011.

(51) Int. Cl.
*H04W 16/14* (2009.01)
*H04W 24/10* (2009.01)
*H04W 84/12* (2009.01)

(52) U.S. Cl.
CPC ............. *H04W 16/14* (2013.01); *H04W 24/10* (2013.01); *H04W 84/12* (2013.01)

(58) Field of Classification Search
CPC .................. H04W 24/10; H04W 16/14; H04W 84/12
See application file for complete search history.

(56) References Cited

U.S. PATENT DOCUMENTS 6,879,823 B1   4/2005   Raaf
7,853,260 B2   12/2010  Holma et al.
(Continued)

FOREIGN PATENT DOCUMENTS

WO   2008/135101 A1   11/2008
WO   2009/099811 A1   8/2009
(Continued)

OTHER PUBLICATIONS

"In-Device Coexistence Interference Between LTE and ISM Bands", 3GPP TSG-RAN WG4 Meeting #55, R4-101992, Agenda item: 7.1.3, CMCC, May 10-14, 2010, 3 pages.
(Continued)

*Primary Examiner* — Jae Y Lee
(74) *Attorney, Agent, or Firm* — Squire Patton Boggs (US) LLP

(57) ABSTRACT

Embodiments include a method and apparatus configured to reduce interference. The method includes determining, by a user equipment, active and inactive subframes of a plurality of subframes associated with a wireless local area network (WLAN) communication. The method then includes performing relative signal quality measurements on the inactive subframes, and providing, to a base station, a relative signal quality measurement report based on the relative signal quality measurements performed on the inactive subframes.

14 Claims, 15 Drawing Sheets

(56) References Cited

U.S. PATENT DOCUMENTS

| | | | |
|---|---|---|---|
| 7,903,612 | B2 | 3/2011 | Choi et al. |
| 2001/0044300 | A1 | 11/2001 | Menzel |
| 2006/0135076 | A1 | 6/2006 | Honkanen et al. |
| 2007/0275746 | A1 | 11/2007 | Bitran |
| 2008/0212460 | A1 | 9/2008 | Sampath |
| 2009/0017756 | A1 | 1/2009 | Tsfaty et al. |
| 2009/0080401 | A1 | 3/2009 | Zhu et al. |
| 2009/0225717 | A1 | 9/2009 | Banerjea |
| 2009/0245221 | A1 | 10/2009 | Piipponen |
| 2009/0247217 | A1 | 10/2009 | Hsu et al. |
| 2009/0318087 | A1 | 12/2009 | Mattila et al. |
| 2010/0067469 | A1 | 3/2010 | Gaal et al. |
| 2010/0216474 | A1 | 8/2010 | Park et al. |
| 2010/0319033 | A1 | 12/2010 | Auranen et al. |
| 2011/0151861 | A1 | 6/2011 | Kim et al. |
| 2012/0071103 | A1* | 3/2012 | Kadous ............... H04W 52/243 455/63.1 |
| 2012/0281563 | A1* | 11/2012 | Comsa ................. H04W 24/10 370/252 |

FOREIGN PATENT DOCUMENTS

| | | | |
|---|---|---|---|
| WO | 2010/112066 | A1 | 10/2010 |
| WO | 2010/142629 | A1 | 12/2010 |
| WO | 2010/146423 | A1 | 12/2010 |
| WO | 2011041662 | A1 | 4/2011 |
| WO | 2011123531 | A1 | 10/2011 |
| WO | 2012014188 | A1 | 2/2012 |

OTHER PUBLICATIONS

"Addition of LTE UE RF Requirements for Coexistence With WLAN", 3GPP TSG-RAN WG4 Meeting #54, R4-100707, Agenda item: 7.1.2, CMCC, Feb. 22-26, 2010, 6 pages.

"Methods for WlAN/Bluetooth In-Device Coexistence Interference Avoidance", 3GPP TSG-RAN WG2 #70bis, R2-103900, Agenda Item: 7.6, Ericsson, Jun. 28-Jul. 2, 2010, pp. 1-3.

Damji et al., "Dynamic Downlink OFDM Resource Allocation With Interference Mitigation and Macro Diversity for Multimedia Services in Wireless Cellular Systems", IEEE Transactions on Vehicular Technology, vol. 55, No. 5, Sep. 2006, pp. 1555-1564.

"3rd Generation Partnership Project; Technical Specification Group Radio Access Network; Evolved Universal Terrestrial Radio Access (E-UTRA); Physical layer procedures (Release 10)", 3GPP TS 36.213, V10.0.1, Dec. 2010, pp. 1-98.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.7.0, Dec. 2008, pp. 144.

"3rd Generation Partnership Project; Technical Specification Group Radio Access Network; Radio Resource Control (RRC); Protocol Specification (Release 9)", 3GPP TS 25.331, V9.1.0, Dec. 2009, pp. 1-1759.

"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331, V9.1.0, Dec. 2009, pp. 1-233.

"3rd Generation Partnership Project;Technical Specification Group Radio Access Network;Evolved Universal Terrestrial Radio Access (E-UTRA); User Equipment (UE) radio transmission and reception(Release 9)", 3GPP TS 36.101, V9.2.0, Dec. 2009, pp. 1-169.

International Search Report and Written Opinion received for corresponding Patent Cooperation Treaty Application No. PCT/IB2011/054226, dated Dec. 19, 2011, 13 pages.

Extended European Search Report received for corresponding European Patent Application No. 12771703.1, dated Mar. 23, 2015, 10 pages.

"3rd Generation Partnership Project;Technical Specification Group Services and System Aspects; Telecommunication management; Home enhanced Node B (HeNB) Subsystem (HeNS) Network Resource Model (NRM Integration Reference Point (IRP); Requirements; (Release 9)", 3GPP TS 32.781 V9.1.0, Mar. 2010, pp. 1-9.

International Search Report and Written Opinion received for corresponding Patent Cooperation Treaty Application No. PCT/FI2012/050055, dated Apr. 11, 2012, 13 pages.

* cited by examiner

APPARATUS AND METHOD TO REDUCE INTERFERENCE BETWEEN DISPARATE COMMUNICATION SYSTEMS

RELATED APPLICATION

This application was originally filed as Patent Cooperation Treaty Application No. PCT/FI2012/050055 filed Jan. 23, 2012 which claims priority benefit to U.S. Provisional Patent Application No. 61/474,019, filed Apr. 11, 2011.

FIELD

Embodiments of the present invention are directed, in general, to communication systems and, in particular, to an apparatus, method and system configured to reduce interference for user equipment operable in disparate communication systems.

BACKGROUND

Long term evolution ("LTE") of the Third Generation Partnership Project ("3GPP"), also referred to as 3GPP LTE, refers to research and development involving the 3GPP LTE Release 8 and beyond as part of an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including radio resource control ("RRC") sublayer) protocol terminations towards wireless communication devices such as cellular telephones. A wireless communication device or terminal is generally known as user equipment (also referred to as "UE"). A base station is an entity of a communication system or network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the radio resource control management, see 3GPP TS 25.331 v.9.1.0 (2009-12) and 3GPP TS 36.331 v.9.1.0 (2009-12), which are incorporated herein by reference.

As wireless communication systems such as cellular telephone, satellite, and microwave communication systems become widely deployed and continue to attract a growing number of users, there is a need to accommodate a large and variable number of communication devices that transmit an increasing quantity of data within a fixed spectral allocation and limited transmit power. The increased quantity of data is a consequence of wireless communication devices transmitting video information and surfing the Internet, as well as performing ordinary voice communication. The aforementioned services are provided while accommodating substantially simultaneous operation of a large number of wireless communication devices.

A further continuing development is the introduction of communication systems such as wireless local area networks ("WLANs") (e.g., WiMAX communication systems) that provide alternative communication services for mobile and fixed-point equipment, and that use frequency bands or channels adjacent to those used by traditional cellular communication systems or networks such as 3GPP LTE communication systems (also referred to as LTE communication systems). Coexistence between the cellular communication systems and the WLAN communication systems sometimes introduces problematic interference therebetween. The interference has been observed between the LTE communication system and the industrial, scientific and medical ("ISM") radio bands used by the WLAN communication systems, especially for communication by a device such as user equipment operable in both communication systems or networks, and also by devices operable on global positioning system ("GPS") radio bands, also referred to as global navigation satellite system ("GNSS") bands.

The 3GPP LTE and ISM technologies working on adjacent frequencies have been observed to exhibit several interference types. One interference type is an ISM device blocking an LTE user equipment, and vice versa. Another interference type is spurious emission from an ISM device producing a level of interference to LTE user equipment, and vice versa. It is generally recognized that a filter for a transceiver of the device or user equipment cannot provide sufficient rejection on an adjacent frequency to eliminate interference between two adjacent communication systems. Accordingly, a generic radio frequency ("RF") front-end design is not expected to resolve this interference problem.

One of the more problematic issues is how to manage the coexistence of two disparate communication systems such as a cellular communication system (e.g., a LTE communication system) and a WLAN communication system. In view of the growing deployment of communication systems such as cellular communication systems as well as WLAN communication systems operating within the same physical area and the introduction of user equipment that is operable with both communication systems, it would be beneficial to coordinate the communications to reduce or avoid interference between the disparate communication systems. In addition, accurate reporting of interference by user equipment can enable improved coordination or allocation of communication resources to reduce or avoid interference between the disparate communication systems.

SUMMARY

One embodiment includes a method for reducing interference. The method includes determining, by a user equipment, active and inactive subframes of a plurality of subframes associated with a wireless local area network (WLAN) communication. The method then includes performing relative signal quality measurements on the inactive subframes, and providing, to a base station, a relative signal quality measurement report based on the relative signal quality measurements performed on the inactive subframes.

Another embodiment is directed to an apparatus. The apparatus includes at least one processor and at least one memory including computer program code. The at least one memory and the computer program code are configured, with the at least one processor, to cause the apparatus at least to determine active and inactive subframes of a plurality of subframes associated with a wireless local area network (WLAN) communication, perform relative signal quality measurements on the inactive subframes, and provide, to a base station, a relative signal quality measurement report based on the relative signal quality measurements performed on the inactive subframes.

In another embodiment, a computer program, embodied on a non-transitory computer readable medium, is provided. The computer program is configured to control a processor to perform a process, including determining active and inactive subframes of a plurality of subframes associated with a wireless local area network (WLAN) communication, performing relative signal quality measurements on the inactive subframes, and providing, to a base station, a relative signal quality measurement report based on the relative signal quality measurements performed on the inactive subframes.

Another embodiment includes a method for reducing interference. The method includes receiving, at a base station, a relative signal quality measurement report for a user equipment based on a determination of active and inactive subframes of a plurality of subframes that may be associated with a WLAN communication from the user equipment. The method then includes allocating communication resources to the user equipment in response to the relative signal quality measurement report.

Another embodiment is directed to an apparatus. The apparatus includes at least one processor and at least one memory including computer program code. The at least one memory and the computer program code are configured, with the at least one processor, to cause the apparatus at least to receive a relative signal quality measurement report for a user equipment based on a determination of active and inactive subframes of a plurality of subframes that may be associated with a WLAN communication from the user equipment, and to allocate communication resources to the user equipment in response to the relative signal quality measurement report.

Another embodiment includes a computer program embodied on a non-transitory computer readable medium. The computer program is configured to control a processor to perform a process, including receiving a relative signal quality measurement report for a user equipment based on a determination of active and inactive subframes of a plurality of subframes that may be associated with a WLAN communication from the user equipment, and allocating communication resources to the user equipment in response to the relative signal quality measurement report.

The foregoing broadly outlines some features and technical advantages of embodiments of the present invention in order that the detailed description of the invention that follows may be better understood. Additional features and advantages of the invention will be described hereinafter, which form the subject of the claims. It should be appreciated by those skilled in the art that the specific embodiment(s) disclosed may be readily utilized as a basis for modifying or designing other structures or processes for carrying out the same purposes of certain embodiments of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of embodiments of the invention, reference is made to the accompanying drawings, in which.

DETAILED DESCRIPTION

The making and using of embodiments of the present invention are discussed in detail below. It should be appreciated, however, that embodiments of the present invention provide many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to embodiments in a specific context of an apparatus, method and system to enable cellular and WLAN communications for user equipment to coordinate the respective operations to manage interference between the two communication systems. The apparatus, method and system are applicable, without limitation, to any communication system including existing and future cellular technologies including 3GPP technologies (i.e., UMTS, LTE, and its future variants such as 4th generation ("4G") communication systems) and a WLAN operable under IEEE Standard 802.11 (or WiMAX operable under IEEE Standard 802.16). Additionally, WLAN communications, communication systems, modules, modes or the like generally include non-cellular equivalents such as, without limitation, technologies related to WiMAX, WiFi, ISM, GPS and Bluetooth.

Figure 1:
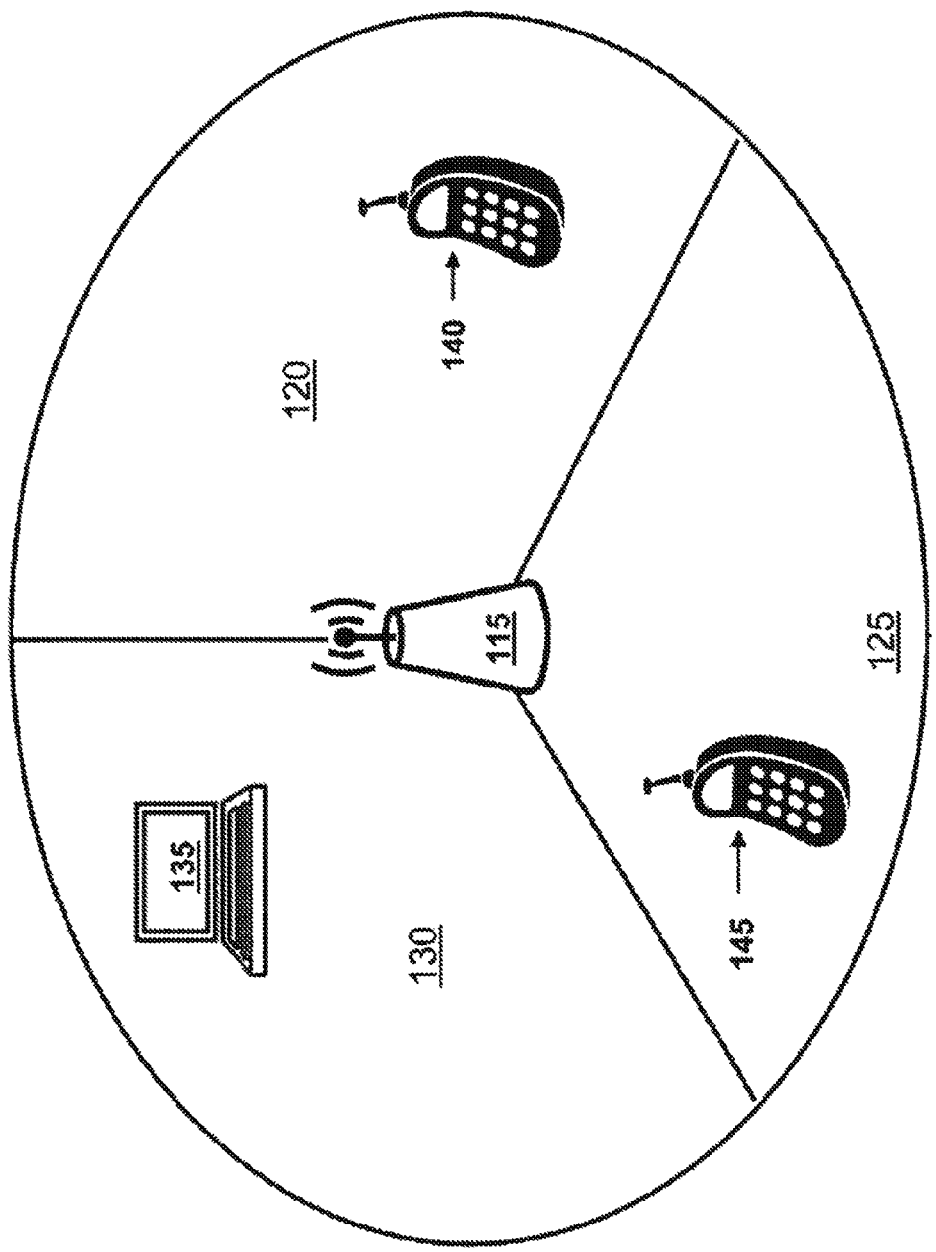
FIG. 1 illustrates a system level diagram according to an embodiment of the present invention.

Referring to FIG. 1, a system level diagram is provided of an embodiment of a communication system including a base station 115 and wireless communication devices (e.g., user equipment) 135, 140, 145. The base station 115 can be coupled, for example, to a public switched telephone network (not shown). The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications.

Figure 2:
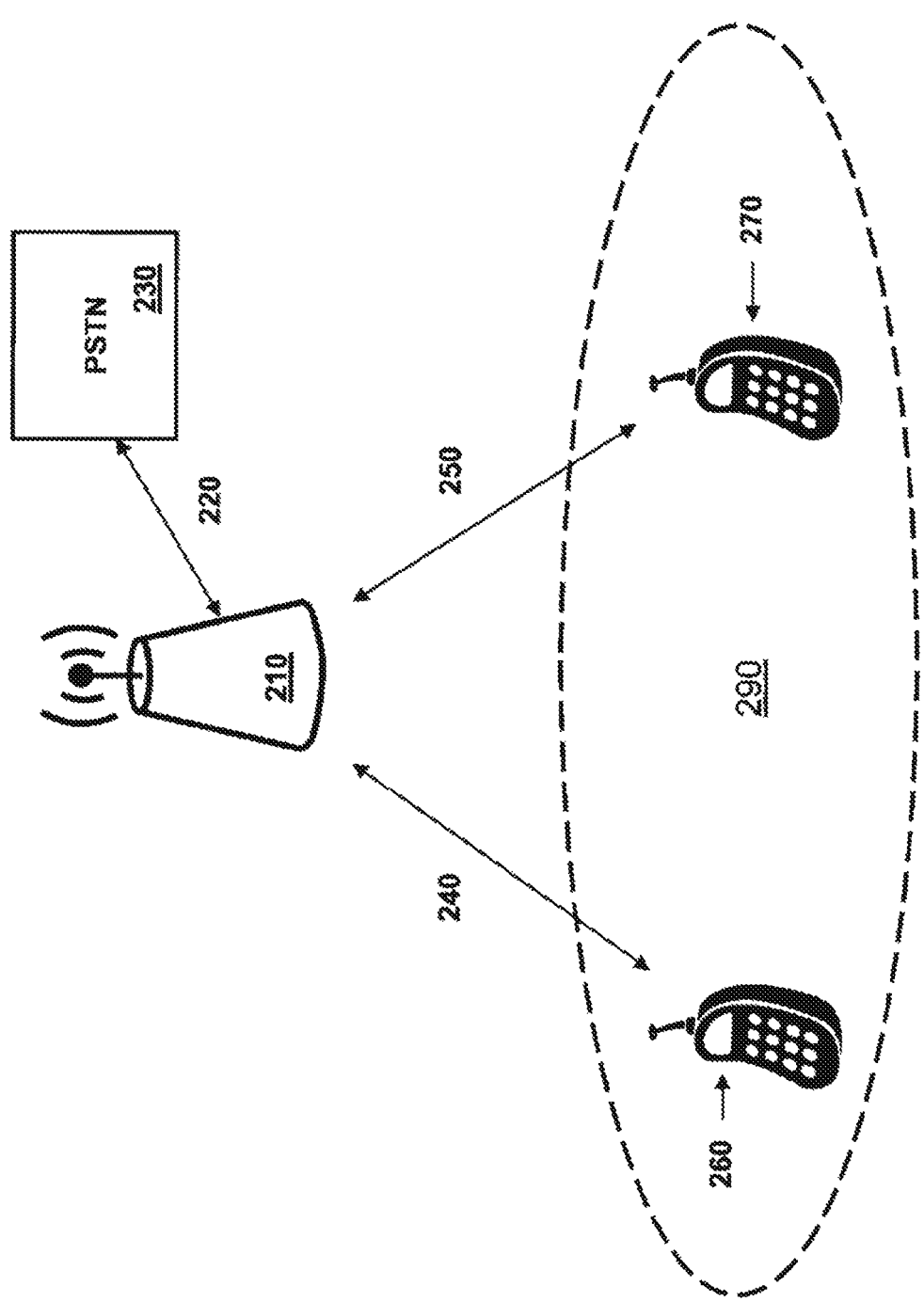
FIG. 2 illustrates a system level diagram according to another embodiment of the present invention.

Referring to FIG. 2, a system level diagram is provided of an embodiment of a communication system including a base station 210 and wireless communication devices (e.g., user equipment) 260, 270. The communication system includes the base station 210 that may be coupled by communication path or link 220 (e.g., by a fiber-optic communication path) to a core telecommunications network, such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications.

Figure 3:
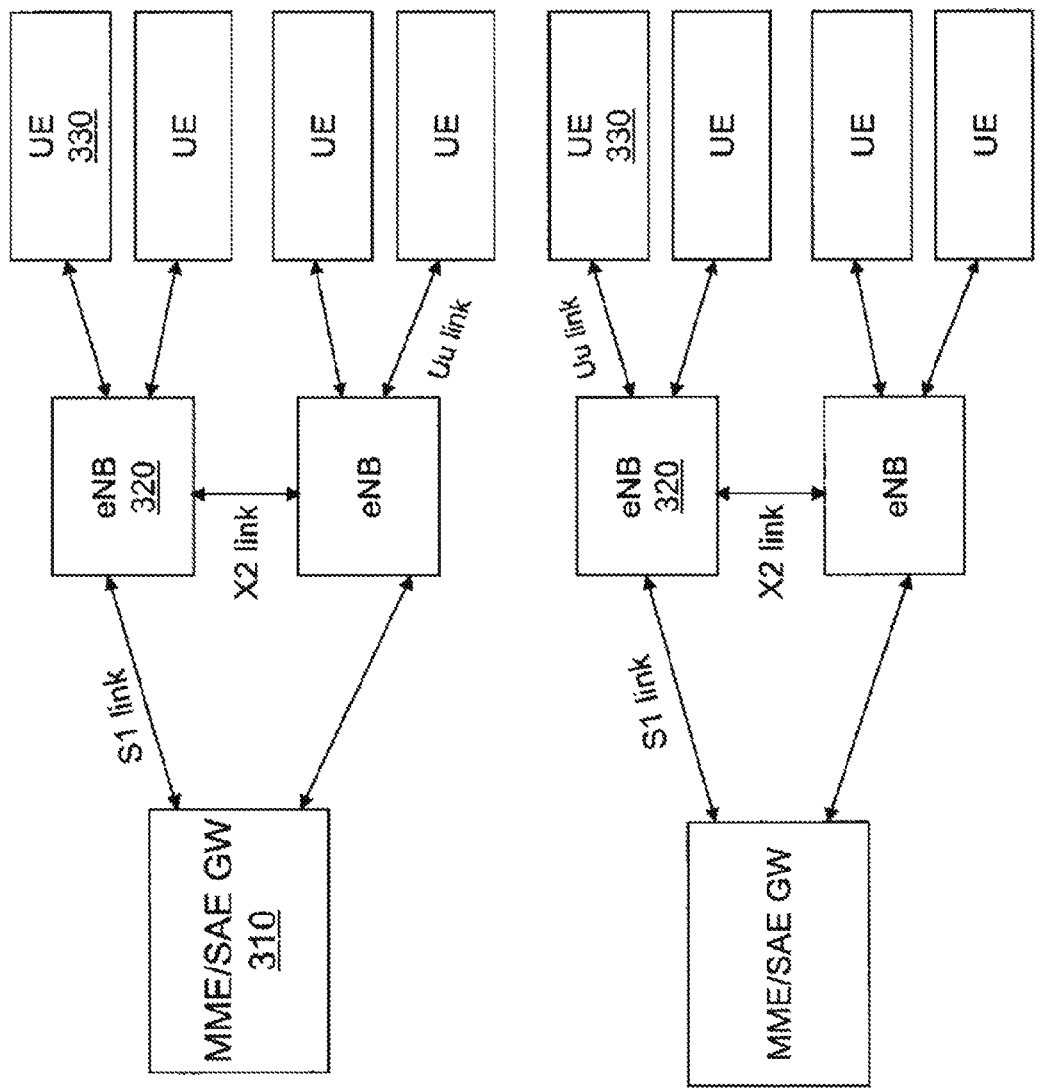
FIG. 3 illustrates a system level diagram according to another embodiment of the present invention.

FIG. 3 illustrates a system level diagram of an embodiment of a communication system including a wireless communication system. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links may be fiber, microwave, or other high-frequency metallic communication paths such as coaxial links, or combinations thereof.

The base stations 320 may communicate with wireless communication devices such as user equipment ("UE," ones of which are designated 330), which is typically a mobile transceiver carried by a user. Thus, communication links (designated "Uu" communication links, ones of which are designated "Uu link") coupling the base stations 320 to the user equipment 330 can be air links employing a wireless communication signal such as, for example, an orthogonal frequency division multiplex ("OFDM") signal. While the user equipment 330 may be part of a primary communication system, the user equipment 330 and other devices such as machines (not shown) may be a part of a secondary communication system to participate in, without limitation, device-to-device and machine-to-machine communications or other communications.

Figure 4:
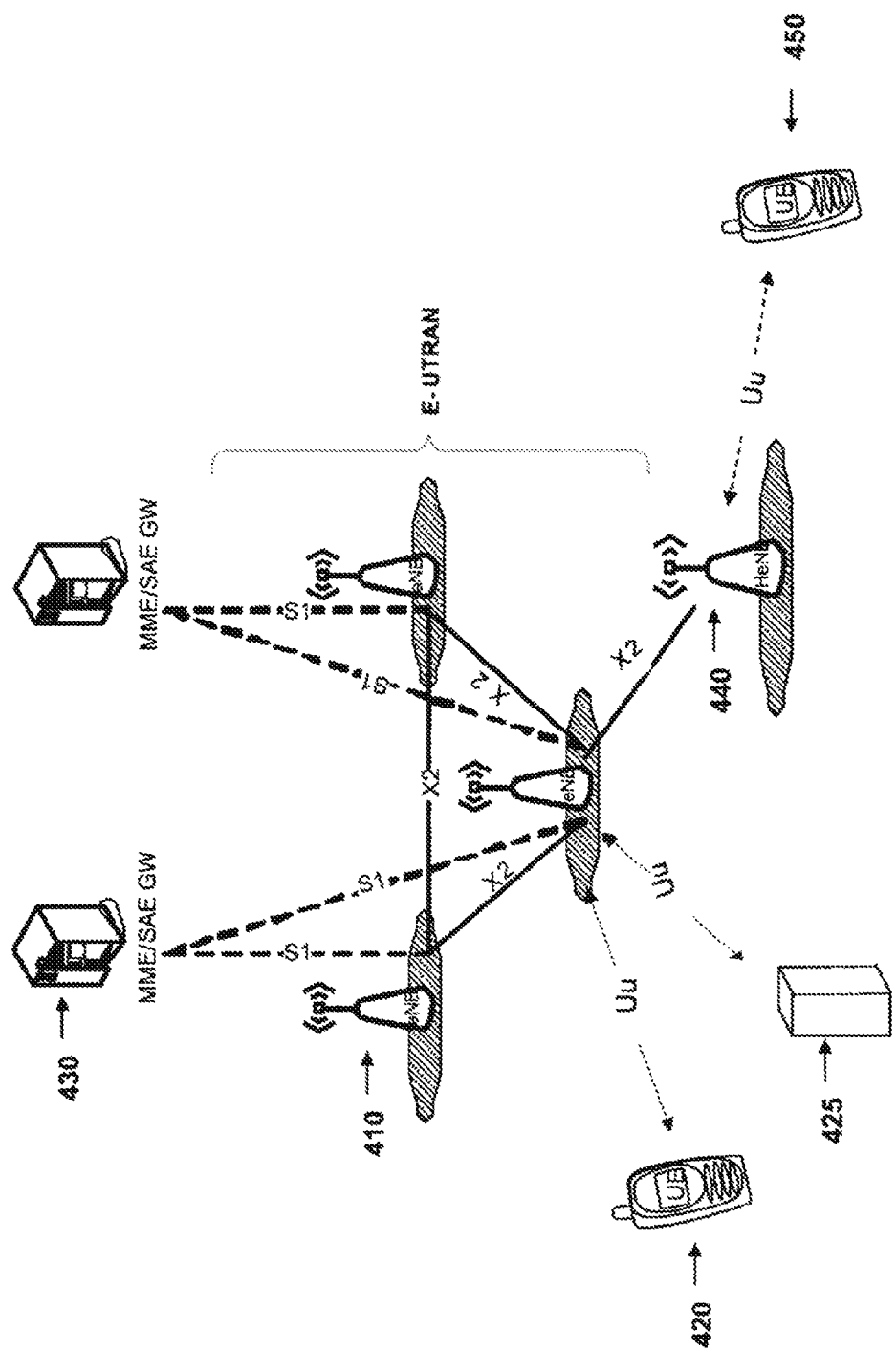
FIG. 4 illustrates a system level diagram according to another embodiment of the present invention.

FIG. 4 illustrates is a system level diagram of an embodiment of a communication system including a wireless communication system. In this embodiment, the wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 can be interconnected with X2 interfaces or communication links (designated "X2"). The base stations 410 may also be connected by S1 interfaces or communication links (designated "S1") to an evolved packet core ("EPC") including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of the user plane for support of the user equipment mobility, idle state mobility control, and system architecture evolution bearer control. The user equipment 420 and machines 425 receive an allocation of a group of information blocks from the base stations 410.

Additionally, at least some of the base stations 410 may be coupled to a home base station 440 (a device), which is coupled to devices such as user equipment 450 and/or machines (not shown) for a secondary communication system. The base station 410 can allocate secondary communication system resources directly to the user equipment 420 and machines 425, or to the home base station 440 for communications (e.g., local communications) within the secondary communication system. For a better understanding of home base stations (designated "HeNB"), see 3GPP TS 32.871 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, device-to-device and machine-to-machine communications or other communications.

Figure 5:
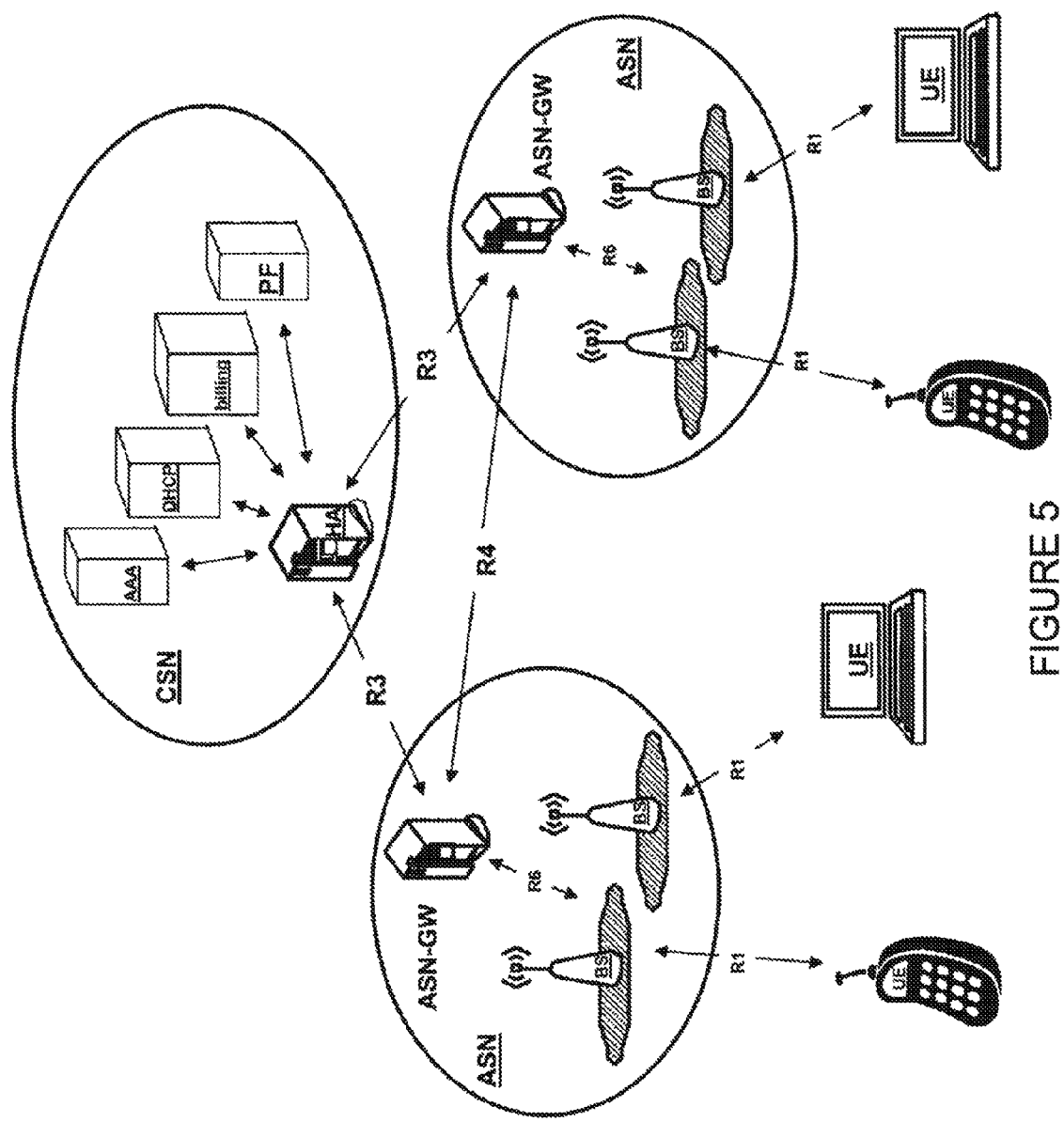
FIG. 5 illustrates a system level diagram according to another embodiment of the present invention.

FIG. 5 illustrates a system level diagram of an embodiment of a communication system including a wireless communication system. The illustrated embodiment provides a WLAN communication system, such as a WiMAX communication system that may be configured according to IEEE Standard 802.16. The WiMAX communication system includes a core service network ("CSN") including a home access ("HA") server. The core service network may provide authentication, authorization, and accounting ("AAA") functions via an AAA server, dynamic host configuration protocol ("DHCP") functions via a DHCP server, billing functions via a billing server, and a policy function ("PF") server. The AAA server validates user credentials, determines functions permissible under a given set of operating conditions and tracks network utilization for billing and other purposes. The DHCP server may be used to retrieve network configuration information such as Internet protocol address assignments. The policy function server can coordinate various network resources to provide requested services to authorized subscribers, and may be responsible for identifying policy rules for a service that a subscriber may intend to use.

The WiMAX communication system further includes access service networks ("ASNs") that include ASN gateways ("ASN-GWs") and base stations ("BSs") that provide wireless communication with user equipment ("UE"). A home access server communicates with the access service networks over R3 interfaces, and the ASN-GWs communicate with other ASN-GWs over R4 interfaces. The ASN-GWs communicate with base stations over R6 interfaces. The base stations can communicate with the user equipment over wireless R1 interfaces.

Figure 6:
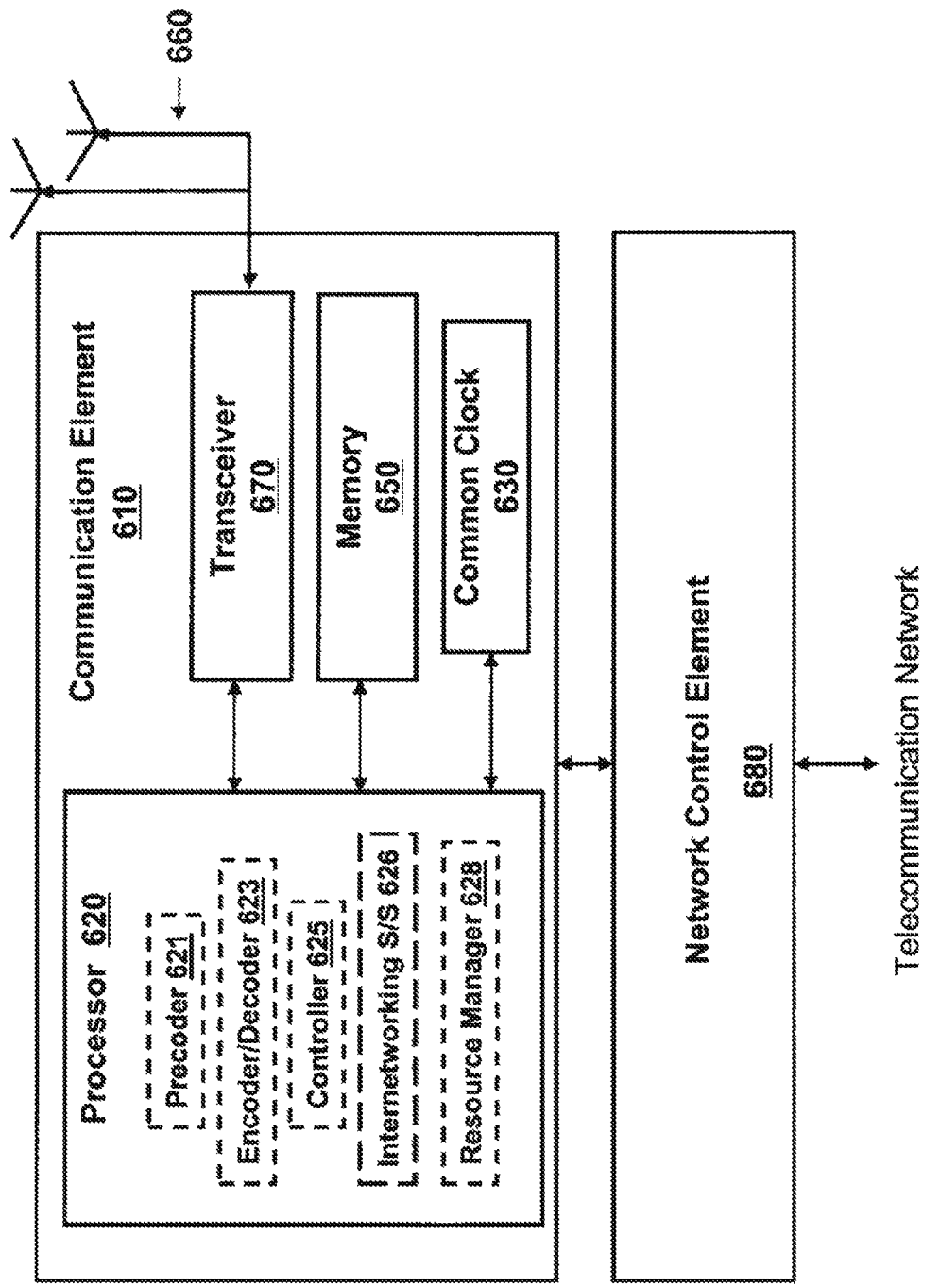
FIG. 6 illustrates a system level diagram according to another embodiment of the present invention.

FIG. 6 illustrates a system level diagram of an embodiment of a communication element 610 of a communication system. The communication element or device 610 may represent, without limitation, a base station, a wireless communication device (e.g., a subscriber station, terminal, mobile station, user equipment, machine), a network control element, a communication node, or the like. The communication element 610 may include, at least, a processor 620, memory 650 that stores programs and data of a temporary or more permanent nature, an antenna 660, and a radio frequency transceiver 670 coupled to the antenna 660 and the processor 620 for bidirectional wireless communication. The communication element 610 may provide point-to-point and/or point-to-multipoint communication services.

The communication element 610, such as a base station in a cellular network, may be coupled to a communication network element, such as a network control element 680 of a public switched telecommunication network ("PSTN"). The network control element 680 may, in turn, be formed with a processor, memory, and other electronic elements (not shown). The network control element 680 generally provides access to a telecommunication network, such as a PSTN. Access may be provided using fiber optic, coaxial, twisted pair, microwave communication, or similar link coupled to an appropriate link-terminating element. A communication element 610 formed as a wireless communication device is generally a self-contained device intended to be carried by an end user.

The processor 620 in the communication element 610, which may be implemented with one or a plurality of processing devices, performs functions associated with its operation including, without limitation, precoding of antenna gain/phase parameters (precoder 621), encoding and decoding (encoder/decoder 623) of individual bits forming a communication message, formatting of information, and overall control (controller 625) of the communication element, including processes related to management of communication resources (resource manager 628). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like. For instance, in accordance with the memory 650, the resource manager 628 is configured to allocate primary and second communication resources (e.g., time and frequency communication resources) for transmission of voice communications and data to/from the communication element 610 and to format messages including the communication resources therefor in a primary and secondary communication system.

The execution of all or portions of particular functions or processes related to management of communication resources may be performed in equipment separate from and/or coupled to the communication element 610, with the results of such functions or processes communicated for execution to the communication element 610. The processor 620 of the communication element 610 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 670 of the communication element 610 modulates information on to a carrier waveform for transmission by the communication element 610 via the antenna(s) 660 to another communication element. The transceiver 670 demodulates information received via the antenna(s) 660 for further processing by other communication elements. The transceiver 670 is capable of supporting duplex operation for the communication element 610. It should be understood that the transceiver 670 may handle different types of communications (such as a cellular communication and a WLAN communication) or the communication element 610 may include multiple transceivers, wherein each transceiver handles a different type of communication.

The memory 650 of the communication element 610, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 650 may include program instructions or computer program code that, when executed by an associated processor, enable the communication element 610 to perform tasks as described herein. Of course, the memory 650 may form a data buffer for data transmitted to and from the communication element 610. Embodiments of the system, subsystems, and modules as described herein may be implemented, at least in part, by computer software executable by processors of, for instance, the wireless communication device and the base station, or by hardware, or by combinations thereof. The systems, subsystems and modules may be embodied in the communication element 610 as illustrated and described herein.

As will become more apparent, when the communication element 610 represents user equipment, the user equipment may be configured to operate in a cellular communication mode (e.g., a LTE communication mode) and/or a WLAN communication mode. If the user equipment is configured to operate in both the cellular (or LTE) and WLAN communication modes, the user equipment may include an inter-networking subsystem 626 including a cellular (or LTE) module that coordinates selected cellular functionality and a WLAN module that coordinates selected WLAN functionality. As a result, the user equipment may reduce interference between cellular communications over a cellular channel and WLAN communications over a WLAN channel. A common time reference for the disparate modes of communication is maintained by a common clock 630. When the communication element represents a base station (e.g., in accordance with a resource manager 628), the base station may be configured to provide corrective action for the user equipment to reduce the interference between the cellular communications over the cellular channel and the WLAN communications over the WLAN channel in accordance with reporting from the user equipment.

Additionally, when the communication element 610 represents user equipment, the user equipment may be configured to determine active and inactive subframes of a plurality of subframes associated with a WLAN communication from the apparatus, perform a relative signal quality measurement on an inactive subframe, and provide a relative signal quality measurement report to a serving base station based on the relative signal quality measurement. Thus, the user equipment is configured to determine active and inactive WLAN channels associated with a WLAN communication, perform a relative signal quality measurement on an inactive WLAN channel, and provide a relative signal quality measurement report to a serving base station based on the relative signal quality measurement. The relative signal quality measurement report may also be modified with respect to an estimated interference level caused by the WLAN communication on the active subframes or WLAN channels. In accordance therewith, the relative signal quality measurement report is provided to the serving base station when the relative signal quality measurement is complete or of sufficient quality.

When the communication element represents a base station (e.g., in accordance with a resource manager 628), the base station may be configured to receive a relative signal quality measurement report for a user equipment based on a determination of active and inactive subframes of a plurality of subframes associated with a WLAN communication from the user equipment, the relative signal quality measurement report including a relative signal quality measurement on an inactive subframe, and allocate communication resources to the user equipment in response to the relative signal quality measurement report. Thus, the base station may be configured to receive a relative signal quality measurement report for a user equipment based on a determination of active and inactive WLAN channels associated with a WLAN communication from the user equipment, the relative signal quality measurement report including a relative signal quality measurement on an inactive WLAN channel, and allocate communication resources to the user equipment in response to the relative signal quality measurement report. The relative signal quality measurement report may also be modified with respect to an estimated interference level caused by the WLAN communication on the active subframes or WLAN channels.

There has been discussion in the 3GPP LTE community of various features of the 3GPP LTE standard that might be utilized to mitigate coexistence problems between a cellular and WLAN communication system. Messages, procedures and techniques are introduced herein to facilitate coexistence between the cellular and WLAN communication systems to ensure that user equipment transmission and reception behaviors are coordinated with a base station to reduce these problems. The general problem of interference between a cellular communication system and another communication system is not restricted to WLAN communication systems. Similar interference can also be produced between a cellular communication system and a Bluetooth communication system.

It has been proposed that a new network signaling value "NS_10" be introduced in 3GPP TS 36.101 v.9.2.0 (2009-12), which is incorporated herein by reference, to indicate that a user equipment will meet an additional requirement for coexistence with a WLAN communication system in a deployment scenario as part of a cell handover/broadcast message. As proposed, the user equipment will work in a subband upon receipt of a network signal indicating a need to achieve a blocking requirement. Otherwise, the user equipment can work in the entire band.

Several other general solutions to the coexistence problem have been discussed. One solution includes enhanced reporting by a user equipment to make the cellular communication system aware of a coexistence issue with a WLAN communication system, and a handover/radio link failure ("HO/RLF") mechanism to move a user equipment to a frequency or radio access technology ("RAT") that does not have a coexistence issue with the ISM radio band. When handover ("HO") is not possible, which may be the case if the user equipment is in an area with deployment of only one frequency, or if the user equipment does not have good channel quality in an alternate frequency, or even if the user equipment does not support multiple radio access technologies, allowing time sharing between the cellular and WLAN communication systems in a manner that is coordinated or controlled by, for instance, a base station could be considered. A further solution is to constrain assignment of a given user equipment to selected frequencies of a cellular communication system that avoids coexistence issues with a WLAN communication system.

Another consideration that has been discussed is introducing a mechanism to control the interaction between downlink and uplink communication resource allocations by communication resource schedulers (e.g., in accordance with a resource manager of a base station) so that a scheduler can predict the frequency location of spurious emissions caused by an uplink signal transmission to reduce user equipment self-interference in a frequency-division duplex ("FDD") system via cooperation between downlink and uplink schedulers. Techniques to reduce possible self-interference in a user equipment with a WLAN communication system have been considered for an uplink scheduler to set lower and upper limits up to a precision of a physical resource block ("PRB") for a physical uplink shared channel ("PUSCH") communication resource allocation.

A mechanism has been discussed for cooperation between a cellular communication system such as a LTE communication system and video and data transmission technologies such as MediaFlo that broadcast one way signals to mobile devices such as user equipment. The user equipment may signal to the cellular communication system that it is currently in a MediaFlo television broadcast receiving mode, as well as identifying time slots in which a cellular uplink transmission could be scheduled without interrupting the MediaFlo broadcast stream. A mechanism has also been discussed to prevent interference with television broadcast reception produced by a cellular uplink transmission. The MobileTV receiver burst timing is signaled from a receiver to the user equipment, which forwards the information to a base station uplink scheduler. The uplink ("UL") scheduler configures the cellular communication system allocation for the user equipment so that interference with mobile television reception is reduced. For exemplary applications related to the cooperation between disparate communication systems, see PCT Application Nos. PCT/EP2009/053839 and PCT/IB2010/001180, which are incorporated herein by reference.

From the perspective of a WLAN communication system causing interference with the cellular communication system, an internetworking subsystem is introduced herein between the WLAN and cellular radio protocol stack to convey information known at the user equipment for the management of a WLAN communication and a cellular communication in the user equipment. The internetworking subsystem may provide an indication of a WLAN communication after receiving a clear-to-send ("CTS") message, if a request-to-send/clear-to-send ("RTS/CTS") procedure is employed. Then the internetworking subsystem directs or performs a signal quality measurement such as an intra-band (or -channel) reference signal received quality ("RSRQ") measurement when the user equipment is transmitting a WLAN communication and other signal strength and/or quality measurements when the user equipment is not transmitting a WLAN communication. The RSRQ measurement parameter is defined as a ratio (N)·RSRP/RSSI, where N is the number of resource blocks of the cellular carrier or channel received signal strength indicator ("RSSI") measurement bandwidth. The RSSI measurement parameter is the total received wideband power by the user equipment from all sources including co-channel serving and non-serving cells, adjacent channel interference and thermal noise within the measurement bandwidth. A reference signal received power ("RSRP") is defined for a specific cell as a linear average over the power contributions of the communication resource elements that carry cell-specific reference signals within the considered measurement frequency bandwidth. While the RSRP measurement parameter is an indicator of the wanted signal strength, the RSRQ measurement parameter additionally takes the interference level into account due to the inclusion of the RSSI measurement parameter. Of course, other signal quality and strength measurements are well within the broad scope of the present invention.

A problem might arise if there is not enough time between a received CTS message and the start of a WLAN communication to process information about the transmission to coordinate activity with respect to the WLAN and cellular communications. In addition, the RTS/CTS mechanism is not always used prior to a WLAN transmission. To overcome the aforementioned problem, a new indication message can be sent between a WLAN module and a cellular module (e.g., an LTE module) within the internetworking subsystem via a new interface to indicate that there is data in a WLAN buffer to be transmitted (i.e., a WLAN communication is to be transmitted). Then, the internetworking subsystem initiates RSRQ measurements and continues until another indication is received from the WLAN module to stop the measurements, or until a certain time period has elapsed. This procedure is followed by a message from the WLAN module to the cellular module or otherwise that shows transmission times on a time line, wherein the time is related to a common clock in the user equipment shared by both WLAN and cellular modules. Using the new indication message, the cellular module evaluates the RSRQ measurement samples by marking each sample either as "active" or "not active" based on the indication message received from WLAN module. Thus, the cellular module can construct a relative RSRQ measurement of samples for which WLAN transmission is active and not active. The relative measurement can be considered as the RSSI difference due to increased interference resulting from active WLAN transmission on an adjacent band or channel. The user equipment reports the relative RSRQ measurement parameter to a base station to evaluate and perform corrective actions for the user equipment.

In one corrective action, the base station institutes scheduler restrictions to prevent allocating communication resources at the edge of a cellular channel next to the WLAN band. In another corrective action, the base station hands the user equipment over, for example, to another frequency band or to another base station. In a further corrective action, the user equipment in an idle state can use the RSRQ measurements from different sample occasions to evaluate reselection criteria, possibly to change a base station or communication resources such as frequency or time slots for a cellular communication.

The user equipment can reduce the priority of the channel, frequency, or time slot impacted by WLAN usage by adding a negative offset into a priority received on broadcast information from a base station for that channel, frequency, or time slot for further reselection evaluation. Setting the priority of the impacted communication resource such as a frequency to zero would allow dismissing the particular communication resource for a while in further reselection evaluations.

Alternatively, the user equipment may assume some level and range of WLAN activity, required WLAN transmission power, and some roll-off factor to estimate expected interference on the cellular communication resource, and do a reselection of the communication resource if the interference is expected to be too high. Also, the user equipment may suggest via the radio resource control layer that a particular carrier frequency of a base station be entered into a "black cell list" from the point of view of the user equipment. If the base station receives similar information from many user equipment in its cell, the base station may enter the particular carrier frequency into a black cell list for all the user equipment in the cell or only user equipment in a certain physical area if the location information of the user equipment is available at the base station. From the perspective of the cellular communication system causing interference to the WLAN communication system, the cellular communication system may indicate that the used band or channel while on the cellular communication system is adjacent to known ISM bands. The indication fields may be conveyed in the radio resource control layer to the user equipment, and the indication can trigger several actions.

A cellular (e.g., an LTE module) module within the user equipment could request interference measurements from a WLAN module in the user equipment related to communication resources that are used by the WLAN module in the user equipment to sense whether or not a WLAN channel(s) is busy or active. The WLAN module may respond to the cellular module that there is not a problem accessing the channels, and thus further actions may be relaxed for a period of time. If the WLAN module observes that the channels are quite busy, it may include interference values with timestamps tied to a common clock in the user equipment, and provide this information to the cellular module in the user equipment. The cellular module in the user equipment can then analyze the interference measurement values against its uplink transmission history to form a quantitative or qualitative estimation about the cellular communication impacting operation of the WLAN communication.

If the cellular module observes that the cellular communication is causing a level of interference on the WLAN communication, the cellular module could then inform the WLAN module within the user equipment about used uplink/downlink division of communication resources in the cell (such as an allocation of channels, frequencies, or time slots), so that the WLAN module can avoid trying to access the WLAN communication system during the uplink portion of a cellular communication, which is a suitable arrangement in a cellular time-division duplex ("TDD") communication system, particularly if the uplink communication resources are partitioned in time slots. An alternative would be that the cellular module informs the WLAN module in the beginning of the used uplink/downlink division of communication resources so that uplink time slots associated with a cellular communication may be avoided. In another alternative employable when a WLAN access point is in control of the operator controlling the cellular communication radio, the user equipment may convey information about interference by the cellular communications to the WLAN communications, and the operator may then change parameters of the WLAN access point. The descriptions of the procedures that follow provide examples of methods of coordinating communications in accordance with user equipment to disparate communication systems that address potential interference associated therewith.

Figure 7:
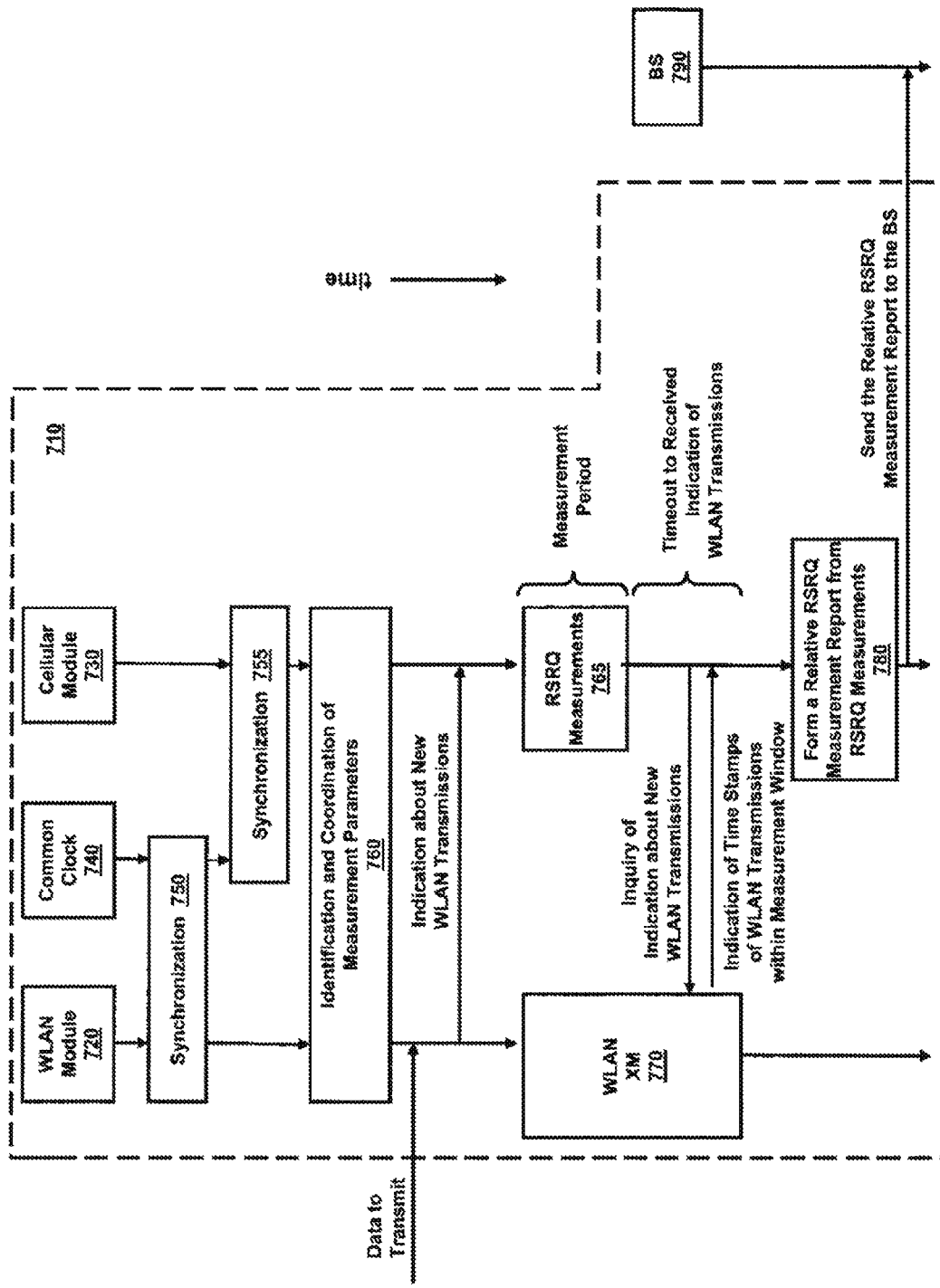
FIG. 7 illustrates a diagram illustrating an example of operations and functionality within a user equipment and a base station associated with communications with disparate communication systems according to one embodiment.

FIG. 7 illustrates a diagram illustrating exemplary operations and functionality within a user equipment 710 and a base station 790 associated with communications with disparate communication systems according to an embodiment. The user equipment 710 includes a WLAN module 720 that coordinates activities related to WLAN functionality and a cellular module 730 that coordinates activities related to cellular functionality. The user equipment is constructed with a common clock 740 that identifies time both to the WLAN module 720 and the cellular module 730. The common clock 740 provides a common time reference for both the WLAN and cellular communications in the user equipment.

Beginning with steps or modules 750, 755, the WLAN module 720 is synchronized with the cellular module 730 via the common clock 740. A step or module 760 identifies and coordinates measurement parameters such as signal quality measurement parameters (e.g., RSRQ, RSSI and RSRP measurement parameters, and channel quality indicator ("CQI")) and informs both the WLAN and cellular modules 720, 730 of a measurement period for acquiring the measurement parameters. At some point in time after coordination of the measurement parameters, the user equipment produces data to transmit, such as voice or video data, on a WLAN channel of the WLAN communication system. The WLAN module 720 provides an indication to the cellular module 730 about new/upcoming WLAN transmissions (i.e., a WLAN communication). The cellular module 730 coordinates signal quality measurements (e.g., RSRQ measurements) on a cellular channel of the cellular communication system adjacent to the WLAN channel as represented by a step or module 765. These RSRQ measurements are made over the measurement period. A measurement period is indicated in FIG. 7 with a timeout to receive an indication of the WLAN transmission.

The cellular module 730 then sends an inquiry to the WLAN module 720 related to the indication by the WLAN module 720 about a new/upcoming WLAN transmission. The WLAN module 720 then coordinates the related transmission on the WLAN channel as represented by a step or module 770. The WLAN module 720 provides an indication of timestamps of the WLAN transmissions within a measurement period (or window) to the cellular module 730. In a step or module 780, the cellular module 730 produces a relative RSRQ measurement report that is transmitted over an uplink channel of a cellular communication system to the base station 790 corresponding to when the WLAN transmissions (or communications) are active and not active. Based on the relative RSRQ measurement report, the base station may take corrective action as described above to reduce or avoid interference between the WLAN communication on the WLAN channel and a cellular communication on the cellular channel.

Figure 8:
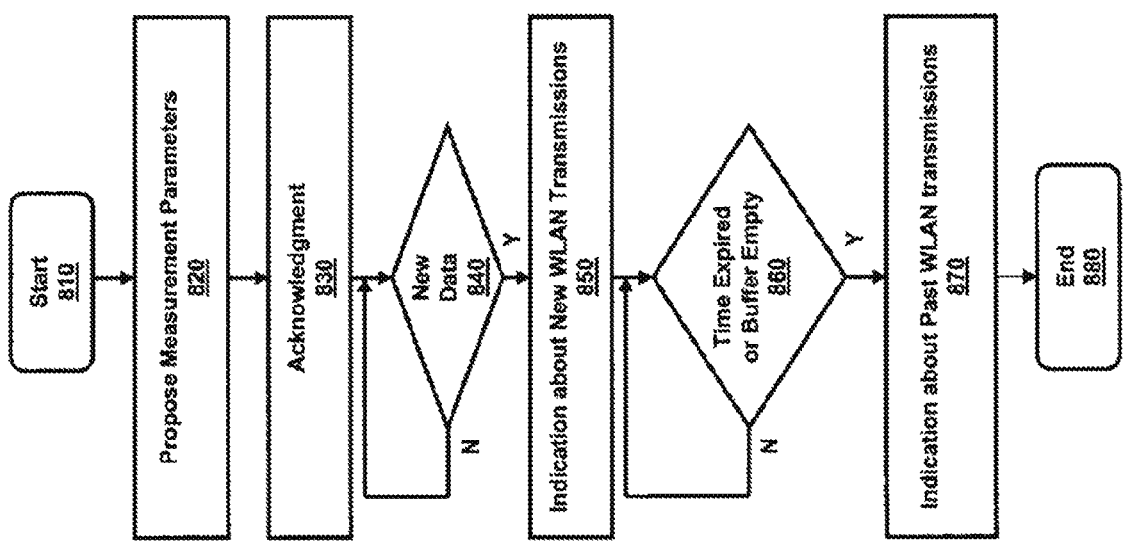
FIG. 8 illustrates a flowchart demonstrating an example of a method according to one embodiment.

FIG. 8 illustrates a flowchart demonstrating an example of a method of operating a WLAN module of user equipment according to one embodiment. The method starts at step or module 810. At a step of module 820, measurement parameters such as a measurement period are identified and coordinated with a cellular module in the user equipment. At a step or module 830, the WLAN module receives acknowledgment of the measurement parameters from the cellular module. The cellular module may propose different parameters to be measured from those identified by the WLAN module. In a decisional step or module 840, the WLAN module repeatedly checks for new data in a buffer new/upcoming WLAN transmissions. When new data is found, in a step or module 850 an indication about new/upcoming WLAN transmissions is sent to the cellular module. In a decisional a step or module 860, the WLAN module checks for an expiration of the measurement period or if the data buffer is empty. In a step or module 870, when the measurement period expires or the data buffer is empty, an indication of past WLAN transmissions within the measurement period (or window) and their timestamps is sent to the cellular module. The method ends at a step or module 880.

Figure 9:
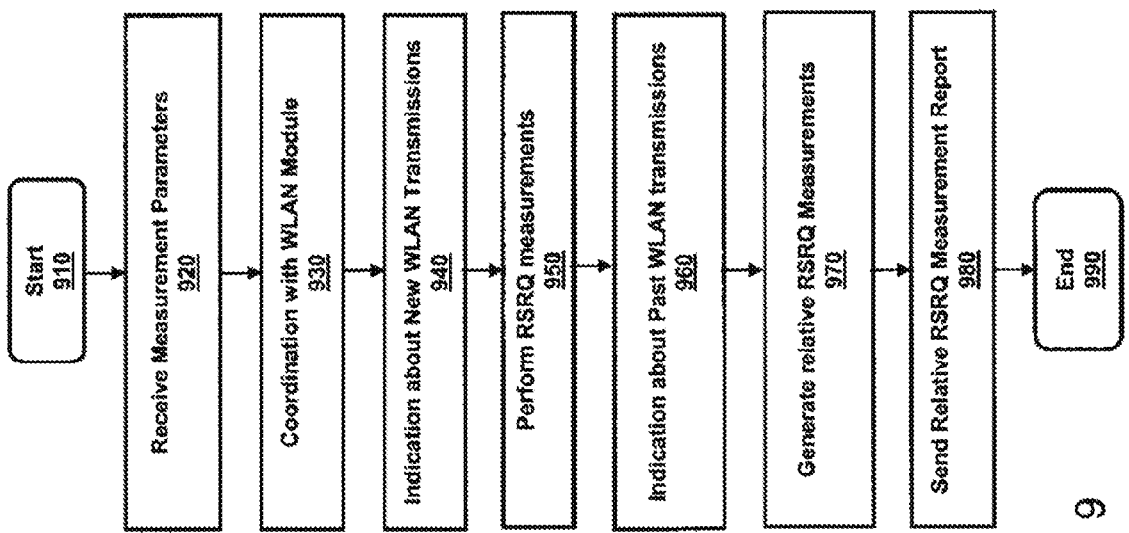
FIG. 9 illustrates a flowchart demonstrating an example of a method according to one embodiment.

FIG. 9 illustrates a flowchart demonstrating an example of a method of operating a cellular module of user equipment according to one embodiment. The method starts at a step or module 910. In a step or module 920, the cellular module receives proposed measurement parameters such as a measurement period from a WLAN module. In a step or module 930, coordination of the measurement parameters with the WLAN module of the user equipment is performed. In a step or module 940, the cellular module receives an indication about new/upcoming WLAN transmissions from the WLAN module. In a step or module 950, signal quality measurements (e.g., RSRQ measurements) are performed on a cellular channel adjacent a WLAN channel for a WLAN transmission (or communication). In a step or module 960, the cellular module accumulates past WLAN transmissions within a measurement period with their timestamps. In a step or module 970, relative RSRQ measurements are generated from RSRQ samples with identification of whether WLAN transmissions occurred (active) or not (not active). In a step or module 980, the cellular module sends a relative RSRQ measurement report to a base station. The method ends at a step or module 990.

Figure 10:
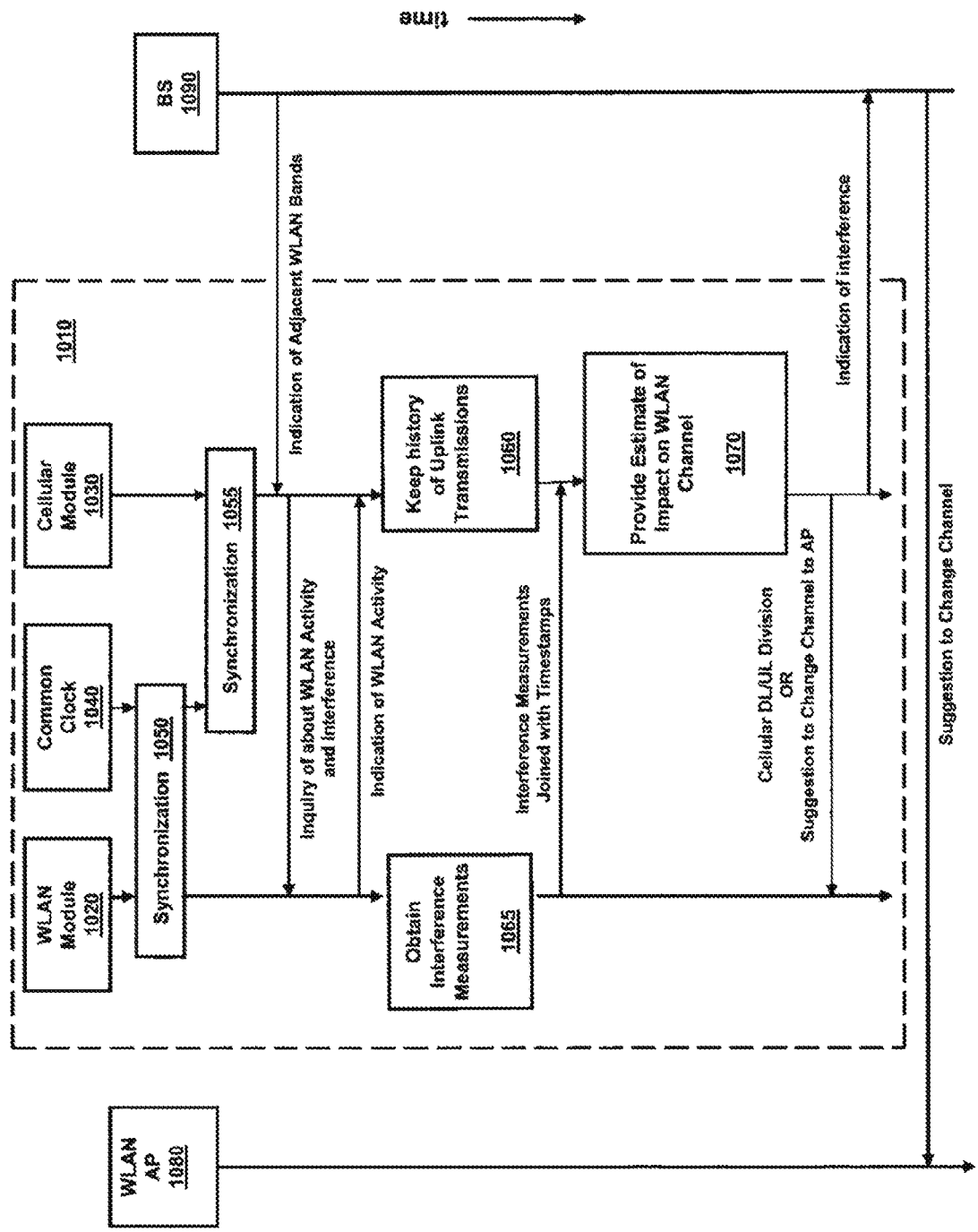
FIG. 10 illustrates a diagram illustrating an example of operations and functionality within a user equipment and a base station associated with communications with disparate communication systems according to an embodiment.

FIG. 10 illustrates a diagram illustrating an example of operations and functionality within a user equipment 1005 and a base station 1090 associated with communications with disparate communication systems according to an embodiment. The user equipment 1010 includes a WLAN module 1020 that coordinates activities related to WLAN functionality and a cellular module 1030 that coordinates activities related to cellular functionality. The user equipment may be constructed with a common clock 1040 that identifies time both to the WLAN module 1020 and the cellular module 1030. The common clock 1040 provides a common time reference for both the WLAN and cellular communications in the user equipment.

Beginning with steps or modules 1050, 1055, the WLAN module 1020 is synchronized with the cellular module 1030 via the common clock 1040. The base station 1090 transmits in a downlink communication resource an indication of an adjacent WLAN band or channel to the cellular module 1030, which makes an inquiry to the WLAN module 1020 for information about WLAN activity and interference. The WLAN module 1020 responds with an indication of WLAN activity. In a step or module 1060, the cellular module 1030 keeps a history of information of the uplink transmissions including timestamps and power levels (i.e., when transmissions occurred (active) or not (not active)). In a step or module 1065, the WLAN module 1020 directs or obtains interference measurements associated with WLAN communications or activity over the WLAN channel from cellular communications over an adjacent cellular channel during measurement periods. The WLAN module 1020 provides the interference measurements with timestamps to the cellular module 1030. In a step or module 1070, the cellular module 1030 provides quantitatively or qualitatively an estimate of an impact on a WLAN band or channel using received interference measurements and its own history information. The cellular module 1030 then provides a cellular downlink/uplink division of communication resources (such as an allocation of channels, frequencies, or time slots) to the WLAN module 1020 for the benefit of employing other communication resources for the WLAN communications. Alternatively, the cellular module 1030 transmits a suggestion to change channels at an access point ("AP") to the WLAN module 1020. The cellular module 1030 then transmits on an uplink to the base station 1090 an indication of interference caused on the WLAN communication including WLAN configuration information. If base station 1090 determines that interference exists between the cellular communication system and the WLAN communication system, the base station transmits a suggestion to change channels to a WLAN access point 1080. In accordance with the foregoing, the WLAN module 1020 may select another communication resource (e.g., a WLAN channel) for the WLAN communications to reduce interference with the cellular communications over the adjacent cellular channel.

Thus, apparatus, methods and systems have been introduced to alleviate interference in a user equipment between a cellular communication system and another wireless communication system such as a WLAN communication system. A WLAN module indicates when a WLAN communication occurs and, in response, the cellular module coordinates RSRQ measurements until a timer expires or the WLAN module signals the cellular module to stop. The cellular module can obtain signal quality or strength (such as a RSSI measurement parameter) from relative RSRQ measurements. The cellular module provides relative signal strength measurements to a base station for evaluation and corrective action, if appropriate.

One example of corrective action is to make scheduler restrictions for uplink or downlink communication resources. Another example of corrective action is to initiate a handover for the user equipment to another base station or another frequency band or channel. The user equipment evaluates the measurements and may alter reselection criteria in anticipation of a handover. The user equipment may suggest a communication resource such as a channel, frequency, or a time slot to the base station that should be added to a black list of frequencies. If base station receives a number of such black-list suggestions, it may selectively add certain communication resources to its black list.

The cellular module may request the WLAN module to make signal strength measurements, from which the cellular module may judge the impact on a WLAN communication. The cellular module may inform the WLAN module which communication resources are suitable for the WLAN communication. Another alternative may be employed in the case when the WLAN access point is in control of the operator controlling the cellular communications radio. The user equipment may convey information about caused interference from the cellular module to the WLAN module, and the operator controlling the cellular communications radio may then change parameters of the WLAN access point.

Thus, an apparatus, method and system are introduced herein for reducing interference for user equipment operable in disparate communication systems. In one embodiment, an apparatus (such as a user equipment) includes a processor and memory including computer program code. The memory and the computer program code are configured, with the processor, to cause the apparatus to provide an indication (e.g., with timestamps) of WLAN communications over a WLAN channel during a measurement period, direct or obtain signal quality measurements (e.g., a RSRQ measurement, a RSSI measurement, a RSRP measurement) of cellular communications over a cellular channel adjacent the WLAN channel for the measurement period, and provide a relative signal quality measurement report of the signal quality measurements of the cellular communications over the cellular channel corresponding to when the WLAN communications over the WLAN channel are active and not active. Additionally, the memory and the computer program code are further configured, with the processor, to cause the apparatus to employ other communication resources or select another cellular channel for the cellular communications to reduce interference with the WLAN communications. The memory and the computer program code are further configured, with the processor, to cause the apparatus to synchronize the WLAN and cellular communications with a common time reference.

In another embodiment, an apparatus (for example, a user equipment) includes a processor and memory including computer program code. The memory and the computer program code are configured, with the processor, to cause the apparatus to provide an indication of cellular communications over a cellular channel during a measurement period, provide interference measurements (with timestamps) associated with the WLAN communications over the WLAN channel adjacent the cellular channel during the measurement period, and form an estimate of interference on the WLAN communications over the WLAN channel from the cellular communications over the cellular channel as a function of the interference measurements and corresponding to when the cellular communications over the cellular channel are active and not active. Additionally, the memory and the computer program code are further configured, with the processor, to cause the apparatus to receive an indication of the WLAN channel for the WLAN communications. The memory and the computer program code are further configured, with the processor, to cause the apparatus to employ other communication resources or select another WLAN channel for the WLAN communications to reduce interference with the cellular communications. The memory and the computer program code are further configured, with the processor, to cause the apparatus to synchronize the WLAN and cellular communications with a common time reference.

In another embodiment, an apparatus (such as a base station) includes a processor and memory including computer program code. The memory and the computer program code are configured, with the processor, to cause the apparatus to receive a relative signal quality measurement report from user equipment of signal quality measurements (e.g., a RSRQ measurement, a RSSI measurement, a RSRP measurement, a CQI measurement) of cellular communications over a cellular channel adjacent a WLAN channel for WLAN communications corresponding to when the WLAN communications over the WLAN channel are active and not active, and provide corrective action for the user equipment to reduce interference between the cellular communications over the cellular channel and the WLAN communications over the WLAN channel. Additionally, the memory and the computer program code are further configured, with the processor, to cause the apparatus to receive the relative signal quality measurement report from a plurality of user equipment and provide the corrective action for the plurality of user equipment. As mentioned above, the corrective action may include scheduler restrictions for one of the cellular communications over the cellular channel and the WLAN communications over the WLAN channel. The corrective action may include selecting communication resources for one of the cellular communications over the cellular channel and the WLAN communications over the WLAN channel. The corrective action may include a handover of the user equipment to another base station, or altering a priority of one of the cellular communications over the cellular channel and the WLAN communications over the WLAN channel.

A 3GPP Release 10 study item has been ongoing related to signaling and procedures for interference avoidance for in-device coexistence ("IDC") between LTE communications (a cellular communication) and GPS/ISM communications (a WLAN communication) within the same device, working in adjacent or in sub-harmonic frequencies. The objective of the study item is to investigate suitable mechanisms for interference avoidance from a signaling and procedure point of view to facilitate coexistence among these services.

The general problem of interference between a cellular communication system and another radio arrangement may include a WLAN communication system as described previously hereinabove. Interference can be produced, for example, between a cellular communication system and a Bluetooth communication system, or between a cellular communication system and an ISM communication system. Accordingly, the processes and methods described hereinbelow are not restricted to interference between an LTE communication system and GPS/ISM communication system.

In order to allow the user equipment to access various communication systems and services ubiquitously, an increasing number thereof may be equipped with multiple radio transceivers. For example, user equipment may be equipped with LTE, WiFi, and Bluetooth transceivers, and also with GNSS receivers. One resulting challenge lies in trying to avoid coexistence interference between those collocated radio transceivers as new frequency bands are being taken into use with narrow or non-existing guard band arrangements with existing frequency allocations.

Due to the extreme proximity of these multiple transceivers within the same user equipment, the transmit power of one transmitter may be much higher than the workable received power level of another receiver. By employing filter technologies and sufficient frequency separation, a transmit signal may not result in significant interference at a colocated receiver. But for some coexistence scenarios (e.g., different radio technologies within the same user equipment operating on adjacent or harmonically related frequency bands), current state-of-the-art filter technology might not provide sufficient signal rejection. Therefore, solving the interference problem by a single, generic radio frequency design may not always be possible, and alternative techniques to avoid interference need to be considered.

Figure 11:
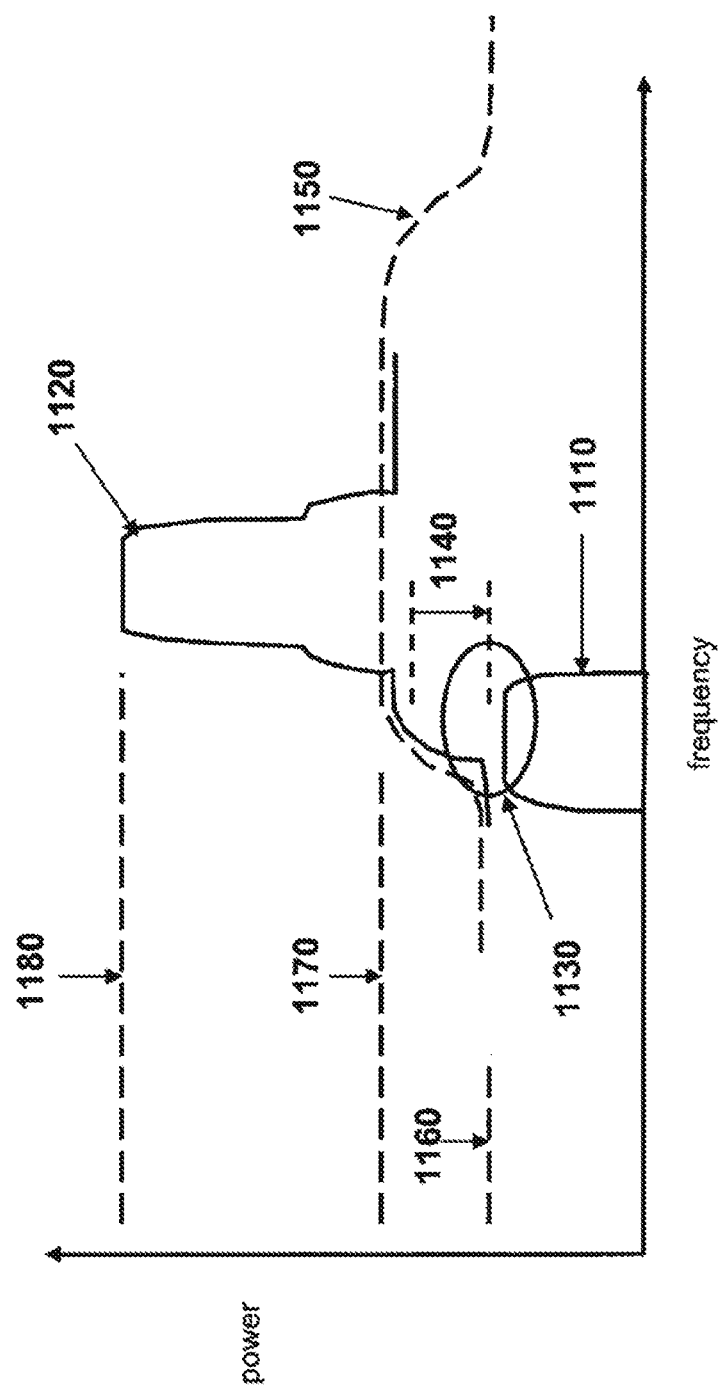
FIG. 11 illustrates a diagram of an example of interference spectrum between disparate communication systems with respect to a communication element in accordance with one embodiment.

FIG. 11 illustrates a diagram of an example of an interference spectrum between disparate communication systems with respect to a communication element in accordance with one embodiment. In the present embodiment, the communication element (e.g. a user equipment) includes a LTE transceiver (an exemplary cellular transceiver) and an ISM transceiver (an exemplary WLAN transceiver). Frequency is represented along the horizontal axis and the power level of transmitted and received signals is represented along the vertical axis of FIG. 11. A curve 1110 represents a desired, received signal of the LTE transceiver of the user equipment. A curve 1120 represents a transmitted signal of an ISM transceiver of the user equipment. A curve 1150 represents a practical bandpass characteristic of a filter employed with the LTE transceiver that produces an antenna isolation 1140 between the ISM transceiver and the received signal of the LTE transceiver. A dashed line 1160 represents a spurious transmission power level of the ISM transceiver. A dashed line 1170 represents the out-of-band transmission power level of the ISM transceiver. Also, a dashed line 1180 represents the transmitted power level of the ISM transceiver. The net result is an unacceptable interference level to the LTE transceiver represented by the oval 1130 that is produced by the ISM transceiver.

An issue for correctly allocating LTE (or cellular) communication resources by a base station (e.g., a serving base station) is the ability of a user equipment to provide to the base station an accurate radio link monitoring ("RLM") and/or an accurate radio resource management ("RRM") measurement at the LTE transceiver in the user equipment in the presence of an ISM or other interfering transceiver. A relative signal quality measurement such as a channel quality indicator ("CQI") is measured by the user equipment according to 3GPP Technical Specification 36.213, clause 7.2.3, "Channel Quality Indicator (CQI) Definition," which is incorporated herein by reference. Link adaptation systems (e.g., algorithms) in the base station are based on measurements such as the CQI measurements reported by the user equipment in the form of a relative signal quality measurement report. The interference from an ISM transmission from, for instance, an ISM transceiver to a LTE transceiver can cause problems for CQI measurement results. Basically, this means that the user equipment will report incorrect CQI measurement results because of interference from the ISM transmission. A consequence of incorrectly reported CQI measurement results is that link adaptation methods and algorithms will not work correctly. In other words, the base station may start to allocate a lower modulation coding scheme ("MCS") than is needed, which can lower communication performance of the system. Since interference can be bursty (due to an ISM transceiver not transmitting continuously), and because CQI measurements are averaged and filtered over time, the user equipment generally does not report worst-case or "clean" measurements, but something in between. If the MCS is set based on averaged measurement results when there is interference, downlink ("DL") communication blocks are often lost. When there is no interference, the MCS is much lower than what could be supported, resulting in poor spectrum efficiency.

Mobility (idle and connected) is typically based on management measurements. The ISM transmission can cause the same problems for RSRQ (and possibly any RRM) measurements as for the CQI measurements described above. This would lead to unpredictable radio resource management measurements causing problems for mobility performance, for example, handovers may be triggered too early due to interference from the ISM transmission.

As described above, a mechanism has been introduced for the removal of interference to downlink RSRQ measurements from a collocated WLAN transceiver (or WLAN communication) by post processing. The WLAN and cellular modules can be synchronized, and the WLAN module can signal activity time stamps to the cellular module, which then removes affected reference symbols from measurement results. The user equipment may thus report both cleaned up and regular relative signal quality measurement reports to the base station. A process including more and simpler implementation aspects is now provided that includes Bluetooth and additional radio link monitoring and radio resource management measurements. In addition, different enhancements for CQI/RSRQ and other RLM/RRM calculations and reporting are also described.

As introduced herein, the subframes without a different transmission (e.g., an inactive subframe associated with a WLAN communication such as an ISM transmission) are taken into account for a relative signal quality measurement (e.g., a CQI, RSRQ or other possible RLM/RRM measurement) on the inactive subframe. From the opposite perspective, subframes with such interference (i.e., a subframe in which there is active WLAN communication) may not be taken into account. Identification of such active or inactive subframes could be achieved by information exchange between the WLAN and cellular modules. The term "in-device" refers to a communication element such as a user equipment with two or more functional capabilities such as a cellular communication and WLAN communication (e.g. a WiMAX or WiFi communication) capability therein. Of course, this includes a user equipment with a cellular transceiver and a WLAN transceiver.

In one example, an indication is provided from a WLAN module (such as a Bluetooth module) that WLAN transmission is ongoing or active. The user equipment can ignore RLM/RRM measurement results in such subframes during a time when such a WLAN transmission is ongoing. Earlier clean signal quality measurement results could be included in a relative signal quality report sent to the base station in lieu of a current measurement. An indication could also be provided from a WLAN module that a WLAN transmission is not ongoing or inactive. The user equipment would then take RLM/RRM measurement results into account in a relative signal quality measurement report transmitted to the base station or communication system, in general. Alternatively, a user equipment could internally estimate how much interference is caused by a WLAN transmission and provide corrected results in a relative signal quality report transmitted to the base station.

Another option would be to indicate in a relative signal quality measurement report if measurements are valid or not (i.e., if the measurement was performed in an "in-device coexistence interference" environment). Also, a "don't care" or similar indicator could be added to the relative signal quality measurement report to indicate if the reported measurements are inaccurate or invalid. The base station would then not initiate a handover or link adaptation, etc., based on such a compromised report. As a further alternative, a number or percentage of "bad" subframes could be indicated by the user equipment. The base station could then consider if the results are good enough for link adaptation purposes, handover, etc. Any combination of the above processes should not be limited. For instance, a user equipment could report corrupted measurements as well as corrected measurements in order to give an idea to a base station of how bad the interference situation experienced by the user equipment is due to the WLAN communication. In the interference accommodation process introduced herein, little or no changes to current link adaptation methods are necessary. Mobility of the user equipment is made more robust, and system communication performance is improved.

Figure 12A:
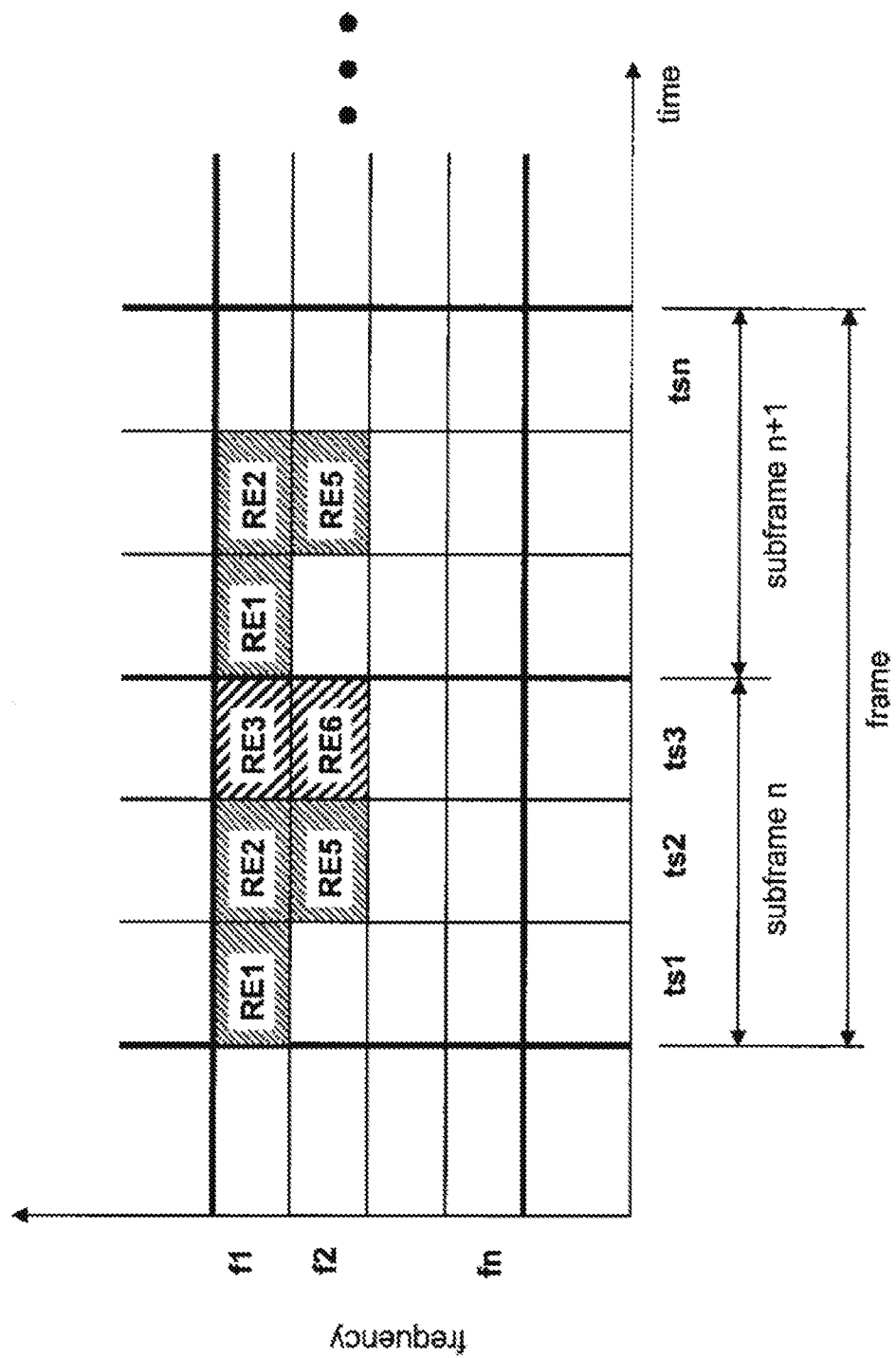
FIGS. 12A and 12B illustrate examples of timing diagrams associated with cellular and WLAN communications in accordance with one embodiment.
Figure 12B:
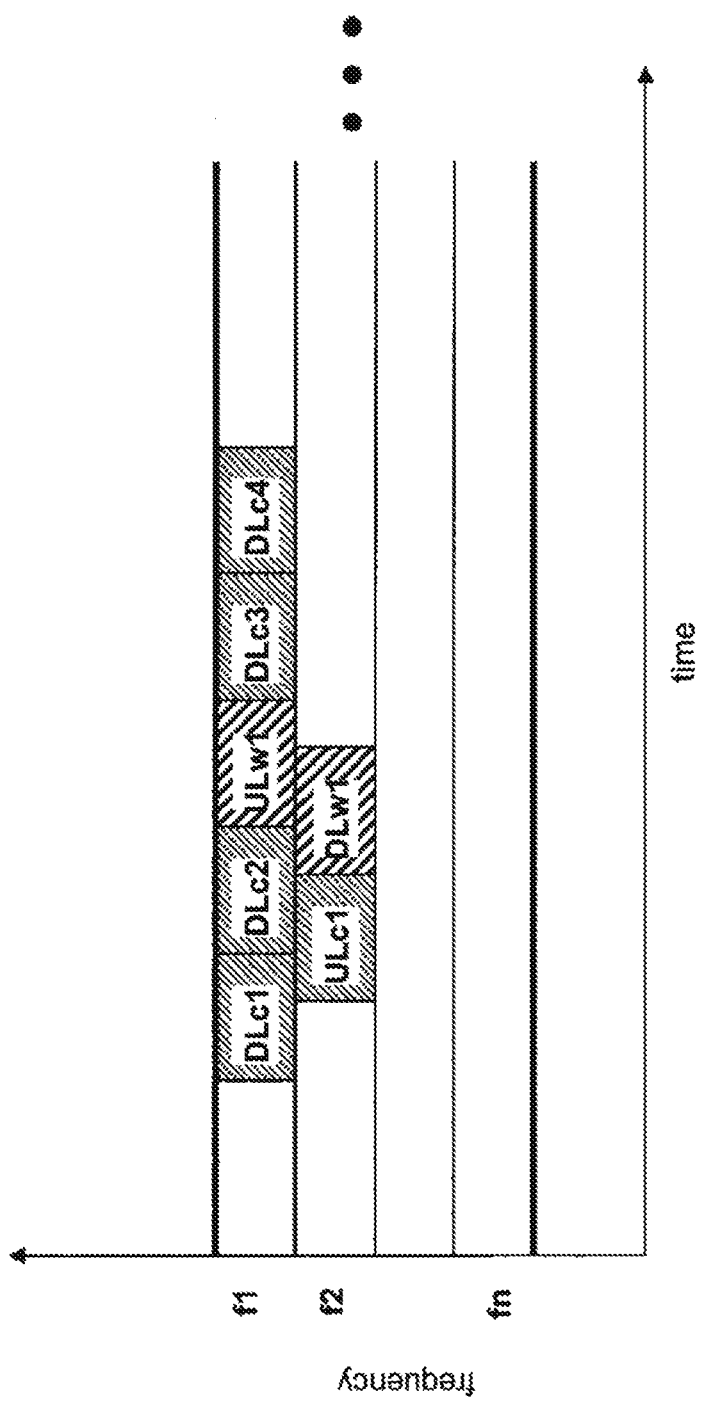

FIGS. 12A and 12B illustrate examples of timing diagrams associated with cellular and WLAN communications in accordance with the principles of the present invention. Beginning with FIG. 12A, a sequence of subframes (designated n, n+1) form a frame to accommodate communication channels such as cellular channels and WLAN channels. A subframe is formed with time slots (designated ts1, ts2, ts3) that span an interval of time, and frequencies (designated f1, f2, . . . , fn) that span a range of frequencies. A communication resource element (designated REn) is formed with a particular time slot and a particular frequency. A communication channel is formed by selectively allocating particular resource elements in a subframe, which may be repeated in subsequent subframes. As illustrated in FIG. 12A, an active cellular channel in subframe n is formed by allocation of resource elements RE1, RE2, RE5, and an active WLAN channel is formed by allocation of resource elements RE3, RE6. In subframe n+1, the cellular channel is still active with respect to a cellular communication, but the WLAN channel is now inactive with respect to a WLAN communication, as illustrated by the absence of resource elements allocated to the WLAN channel. By orthogonalizing signals, a particular resource element may be assigned to a cellular and WLAN channel for cellular and WLAN communications, respectively. Of course, the timing and frequency alignment illustrated with respect to the subframes of FIG. 12A is provided for demonstration purposes only and the respective subframes may overlap in time or frequency.

In a more general sense, FIG. 12B illustrates cellular and WLAN communications over cellular and WLAN channels, respectively, as a function of time. The downlink cellular communications are designated DLc1, DLc2, DLc3, DLc4 and the uplink cellular communication is designated ULc1. The downlink WLAN communication is designated DLw1 and the uplink WLAN communication is designated ULw1. In the illustrated embodiment, the downlink cellular communications DLc1, DLc2 are interfered by the uplink WLAN communication ULw1. Additionally, the downlink WLAN communication DLw1 is interfered by the uplink cellular communication ULc1. Moreover, the downlink cellular communication DLc4 is not interfered by a WLAN communication. The system as described herein can take into account inactive (unused) and active (used) channels in accordance with the relative signal quality measurement reports to reduce interference for user equipment operable in disparate communication systems. It should also be noted that the timing diagram of FIG. 12B illustrates overlap between the cellular and WLAN communications.

Figure 13B:
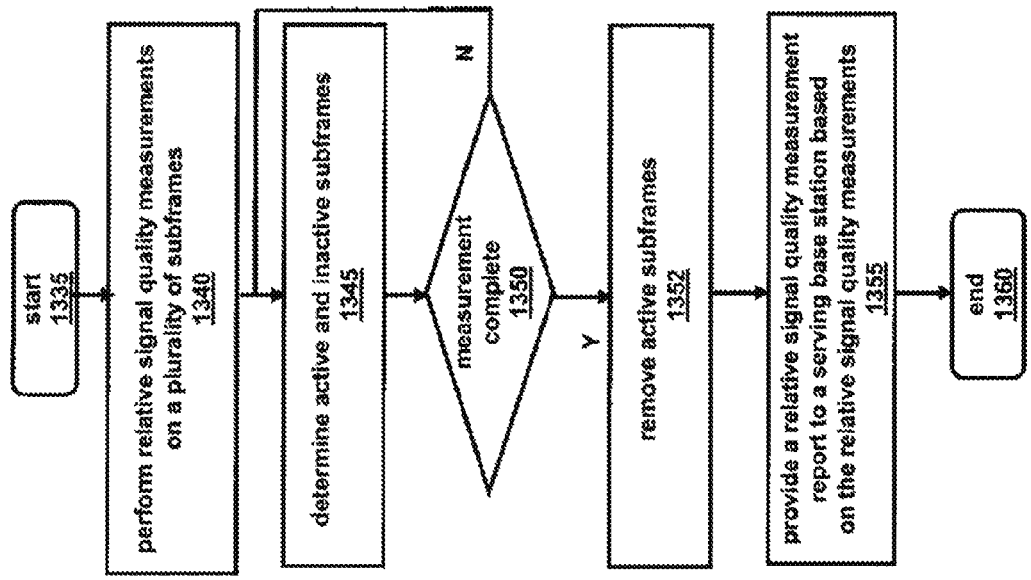
FIGS. 13A to 13C illustrate flowcharts demonstrating examples of methods according to certain embodiments.
Figure 13A:
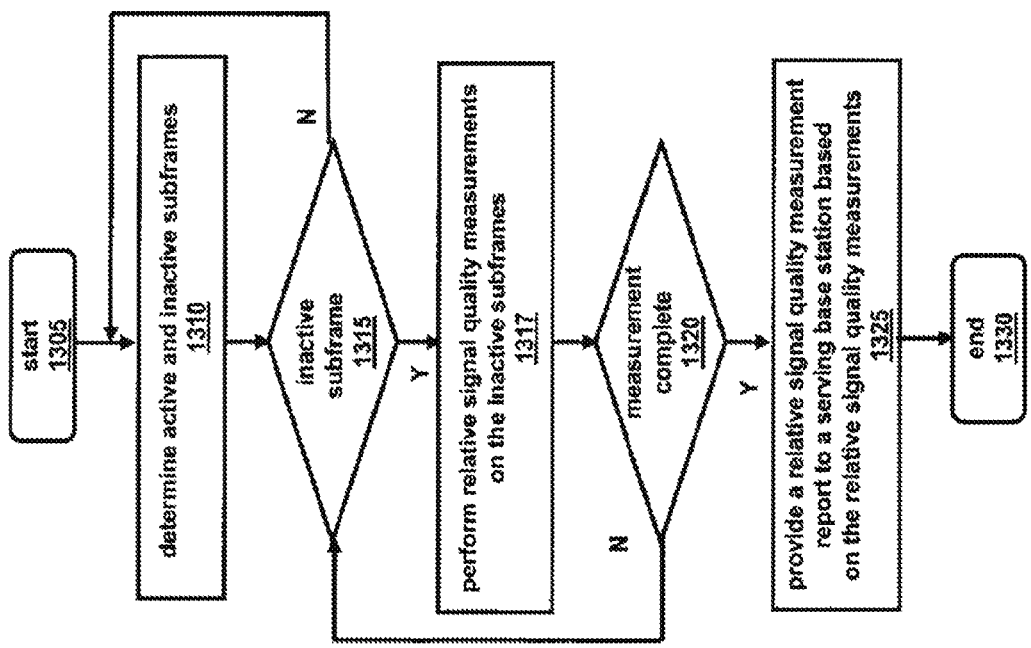
Figure 13C:
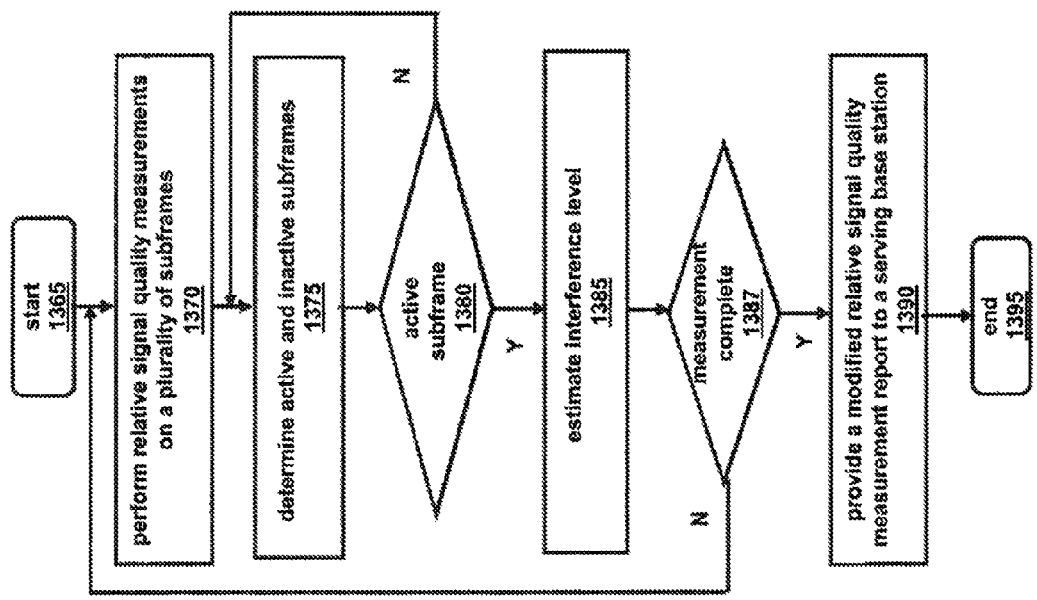

FIGS. 13A to 13C illustrate flowcharts demonstrating examples of methods of operating a user equipment (e.g., a cellular module therein) according to certain embodiments. Beginning with FIG. 13A, the method starts at a step or module 1305. At a step or module 1310, the cellular module determines active and inactive subframes of a plurality of subframes that may be associated with a WLAN communication. Activity or inactivity of a particular subframe can be determined by an information exchange from a WLAN module associated with the WLAN communication. At a decisional step or module 1315, the cellular module determines or identifies which subframes are inactive with respect to a WLAN communication. Regarding the active subframes, the method returns to determine the active and inactive subframes at the step or module 1310. Otherwise at a step or module 1317, the cellular module performs relative signal quality measurements on the inactive subframes. Preferably the cellular module employs inactive subframes with respect to WLAN communications to produce the relative signal quality measurement reports, relying on the absence of interference caused by a WLAN communication mode in such inactive subframes.

At a decisional step or module 1320, the method determines if the relative signal quality measurements are complete or of sufficient quality to proceed. If the relative signal quality measurements are not complete or of sufficient quality, the method returns to determine which subframes are inactive with respect to a WLAN communication at the decisional step or module 1315. Otherwise at a step or module 1325, the cellular module provides a relative signal quality measurement report to a serving base station based on relative signal quality measurements. The relative signal quality measurement report may include a percentage of active subframes with respect to a WLAN communication of the plurality of subframes. The relative signal quality measurement report may also include an indication that relative signal quality measurements included in the relative signal quality measurement report are not accurate or valid. The relative signal quality measurement report may include at least one of a reference signal received power measurement, a channel quality indicator, and a reference signal received quality measurement. In general, the relative signal quality measurement report may include a radio link monitoring parameter. The method ends at a step or module 1330.

Referring to FIG. 13B, the method starts at a step or module 1335. At a step or module 1340, the cellular module performs relative signal quality measurements on a plurality of subframes (including active and inactive subframes associated with a WLAN communication). At a step or module 1345, the cellular module determines the active and inactive subframes of the plurality of subframes that may be associated with a WLAN communication from the relative signal quality measurements. At a decisional step or module 1350, the method determines if the relative signal quality measurements are complete or of sufficient quality to proceed. If the relative signal quality measurements are not complete or of sufficient quality, the method returns to determine the active and inactive subframes of the plurality of subframes that may be associated with a WLAN communication at the step or module 1345. Otherwise at a step or module 1352, the cellular module removes the active subframes associated with the relative signal quality measurements on the plurality of subframes.

Thereafter, the cellular module provides a relative signal quality measurement report to a serving base station based on relative signal quality measurements for the inactive subframes at step or module 1355. The relative signal quality measurement report may include a percentage of active subframes with respect to a WLAN communication of the plurality of subframes. The relative signal quality measurement report may also include an indication that relative signal quality measurements included in the relative signal quality measurement report are not accurate or valid. The relative signal quality measurement report may include at least one of a reference signal received power measurement, a channel quality indicator, and a reference signal received quality measurement. In general, the relative signal quality measurement report may include a radio link monitoring parameter. The method ends at a step or module 1360.

Referring to FIG. 13C, the method starts at a step or module 1365. At a step or module 1370, the cellular module performs relative signal quality measurements on a plurality of subframes (including active and inactive subframes associated with a WLAN communication). At a step or module 1375, the cellular module determines active and inactive subframes of the plurality of subframes that may be associated with a WLAN communication from the relative signal quality measurements. At a decisional step or module 1380, the cellular module determines which subframes are active with respect to a WLAN communication. Regarding the inactive subframes, the method returns to determine the active and inactive subframes at the step or module 1375.

Otherwise, the cellular module estimates an interference level caused by the WLAN communication on the active subframes at a step or module 1385. At a decisional step or module 1387, the method determines if the relative signal quality measurements are complete or of sufficient quality to proceed. If the relative signal quality measurements are not complete or of sufficient quality, the method returns to perform relative signal quality measurements on a plurality of subframes at the step or module 1370.

Otherwise, the cellular module then provides a modified relative signal quality measurement report accordingly at a step or module 1390. The cellular module provides a modified relative signal quality measurement report to a serving base station based on the estimate of the interference level and the relative signal quality measurements for the active subframes. The modified relative signal quality measurement report may include a percentage of active subframes with respect to a WLAN communication of the plurality of subframes. The modified relative signal quality measurement report may also include an indication that relative signal quality measurements included in the modified relative signal quality measurement report are not accurate or valid. The modified relative signal quality measurement report may include at least one of a reference signal received power measurement, a channel quality indicator, and a reference signal received quality measurement. In general, the modified relative signal quality measurement report may include a radio link monitoring parameter. The method ends at a step or module 1395.

Figure 14:
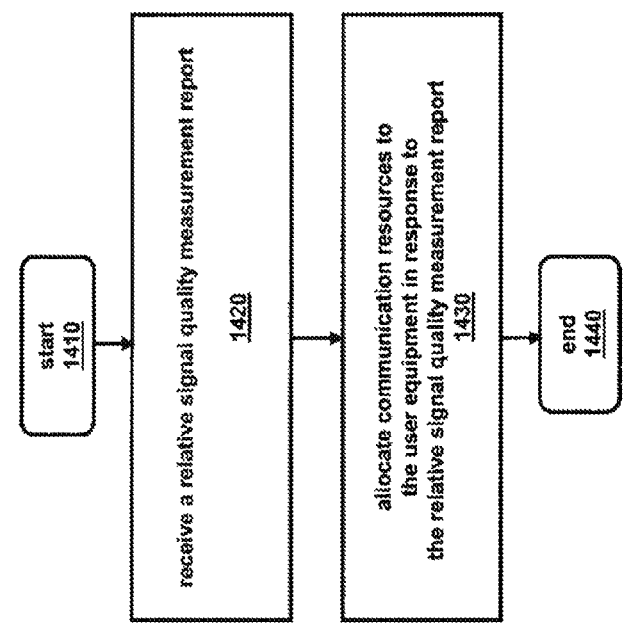
FIG. 14 illustrates a flowchart demonstrating an example of a method according to one embodiment.

FIG. 14 illustrates a flowchart demonstrating an example of a method of operating a base station (e.g. a module therein) according to one embodiment. The method starts at step or module 1410. At step or module 1420, the module receives a relative signal quality measurement report for a user equipment based on a determination of active and inactive subframes of a plurality of subframes that may be associated with a WLAN communication from the user equipment. The relative signal quality measurement report may include a percentage of active subframes associated with the WLAN communication of the plurality of subframes. The relative signal quality measurement report may also include an indication that relative signal quality measurements included in the relative signal quality measurement report are not accurate or valid. The relative signal quality measurement report may include at least one of a reference signal received power measurement, a channel quality indicator, and a reference signal received quality measurement. In general, the relative signal quality measurement report may include a radio link monitoring parameter. At step or module 1430, the module allocates communication resources to the user equipment in response to the relative signal quality measurement report. The method ends at step or module 1440. The relative signal quality measurement report may also be modified with respect to an interference level caused by the WLAN communication on the active subframes. It should also be noted with respect to the aforementioned methods of operating the user equipment and base station that the principles as described herein are not limited to subframes, but are equally applicable to activity or inactivity of WLAN communications over any communication resource such as a WLAN channel or the like.

Thus, an apparatus, method and system are introduced herein for reducing interference for user equipment operable in disparate communication systems. In one embodiment, an apparatus (e.g., embodied in a user equipment) includes a processor and memory including computer program code. The memory and the computer program code are configured, with the processor, to cause the apparatus to determine active and inactive subframes of a plurality of subframes associated with a WLAN communication from the apparatus, perform a relative signal quality measurement (e.g., a reference signal received power ("RSRP"), a channel quality indicator ("CQI"), a reference signal received quality ("RSRQ") measurement or a radio link monitoring ("RLM") parameter) on an inactive subframe, and provide a relative signal quality measurement report to a serving base station based on the relative signal quality measurement. In accordance therewith, the memory and the computer program code is further configured to, with the processor, cause the apparatus to provide the relative signal quality measurement report to the serving base station when the relative signal quality measurement is complete or of sufficient quality.

Additionally, the memory and the computer program code is further configured to, with the processor, cause the apparatus to perform relative signal quality measurements on an active subframes, estimate an interference level caused by the WLAN communications on the active subframe and provide a modified relative signal quality measurement report to the serving base station with respect to the active subframe. The relative signal quality measurement report may include a percentage of the active subframes of the plurality of subframes. Also, the relative signal quality measurement report may include an indication that the (modified) relative signal quality measurement is not valid. The active and inactive subframes may be determined by an information exchange from a WLAN module associated with the WLAN communication. Also, the active and inactive subframes associated with a WLAN communication may be determined from the relative signal quality measurements.

In another embodiment, an apparatus (e.g., embodied in a base station) includes a processor and memory including computer program code. The memory and the computer program code are configured, with the processor, to cause the apparatus to receive a relative signal quality measurement report for a user equipment based on a determination of active and inactive subframes of a plurality of subframes associated with a WLAN communication from the user equipment, the relative signal quality measurement report including a relative signal quality measurement on the active and inactive subframes, and allocate communication resources to the user equipment in response to the relative signal quality measurement report. The relative signal quality measurement report may also include a percentage of active subframes of the plurality of subframes and include an indication that the relative signal quality measurement is not valid. Again, the relative signal quality measurement may include at least one of a reference signal received power ("RSRP"), a channel quality indicator ("CQI"), a reference signal received quality ("RSRQ") measurement and a radio link monitoring ("RLM") parameter. Also, the relative signal quality measurement report may also be modified with respect to an estimated interference level caused by the WLAN communication on the active subframes.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, embodiments provide both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention. Embodiments of the invention may also be suitably combined or joined while still falling within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

We claim:

1. A method, comprising:
   determining, by a user equipment, active and inactive subframes of a plurality of subframes associated with a wireless local area network (WLAN) communication;
   performing relative signal quality measurements on the inactive subframes;
   providing, to a base station, a relative signal quality measurement report based on the relative signal quality measurements performed on the inactive subframes;
   estimating interference level caused by the wireless local area network (WLAN) communication on the active subframes; and
   providing a modified relative signal quality measurement report of the relative signal quality measurement report, to the base station based on the estimate of the interference level and the relative signal quality measurements for the active subframes,
   wherein the determining comprises identifying which of the plurality of subframes are inactive with respect to the wireless local area network (WLAN) communication,
   wherein at least one of the relative signal quality measurements comprises a radio link monitoring parameter, and at least one of the relative signal quality measurements comprises a radio resource management parameter, and
   wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

2. The method according to claim 1, further comprising determining whether the relative signal quality measurements are complete or of sufficient quality, wherein the providing comprises providing the relative signal quality measurement report to the base station when the relative signal quality measurements are determined to be complete or of sufficient quality.

3. The method according to claim 1, wherein the active and inactive subframes are determined by an information exchange from a wireless local area network (WLAN) module of the user equipment associated with the wireless local area network (WLAN) communication.

4. The method according to claim 1, wherein at least one of the relative signal quality measurement report comprises one of:
   an indication of a percentage of the active subframes with respect to the wireless local area network (WLAN) communication of the plurality of subframes; or
   an indication that the relative signal quality measurements included in the relative signal quality measurement report are not valid; or
   at least one of a reference signal received power measurement, a channel quality indicator, a reference signal received quality measurement, or a radio link monitoring parameter.

5. An apparatus, comprising:
   at least one processor; and
   at least one memory including computer program code;
   the at least one memory and the computer program code are configured, with the at least one processor, to cause the apparatus at least to
   determine active and inactive subframes of a plurality of subframes associated with a wireless local area network (WLAN) communication;
   perform relative signal quality measurements on the inactive subframes;
   provide, to a base station, a relative signal quality measurement report based on the relative signal quality measurements performed on the inactive subframes;
   estimate interference level caused by the wireless local area network (WLAN) communication on the active subframes; and
   provide a modified relative signal quality measurement report of the relative signal quality measurement report, to the base station based on the estimate of the interference level and the relative signal quality measurements for the active subframes,
   wherein the at least one memory and the computer program code are further configured, with the at least one processor, to cause the apparatus at least to determine the active and inactive subframes by identifying which of the plurality of subframes are inactive with respect to the wireless local area network (WLAN) communication,
   wherein at least one of the relative signal quality measurements comprises a radio link monitoring parameter, and at least one of the relative signal quality measurements comprises a radio resource management parameter, and
   wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

6. The apparatus according to claim 5, wherein the at least one memory and the computer program code are further configured, with the at least one processor, to cause the apparatus at least to determine whether the relative signal quality measurements are complete or of sufficient quality, and to provide the relative signal quality measurement report to the base station when the relative signal quality measurements are determined to be complete or of sufficient quality.

7. The apparatus according to claim 5, wherein the active and inactive subframes are determined by an information exchange from a wireless local area network (WLAN) module of the apparatus associated with the wireless local area network (WLAN) communication.

8. The apparatus according to claim 5, wherein at one of the signal quality measurement report comprises one of:
an indication of a percentage of the active subframes with respect to the wireless local area network (WLAN) communication of the plurality of subframes; or
an indication that the relative signal quality measurements included in the signal quality measurement report are not valid; or
at least one of a reference signal received power measurement, a channel quality indicator, a reference signal received quality measurement, or a radio link monitoring parameter.

9. A computer program, embodied on a non-transitory computer readable medium, the computer program configured to control a processor to perform a process, the process comprising:
determining active and inactive subframes of a plurality of subframes associated with a wireless local area network (WLAN) communication;
performing relative signal quality measurements on the inactive subframes;
providing, to a base station, a relative signal quality measurement report based on the relative signal quality measurements performed on the inactive subframes;
estimating interference level caused by the wireless local area network (WLAN) communication on the active subframes; and
providing a modified relative signal quality measurement report of the relative signal quality measurement report, to the base station based on the estimate of the interference level and the relative signal quality measurements for the active subframes,
wherein the determining comprises identifying which of the plurality of subframes are inactive with respect to the wireless local area network (WLAN) communication,
wherein at least one of the relative signal quality measurements comprises a radio link monitoring parameter, and at least one of the relative signal quality measurements comprises a radio resource management parameter, and
wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

10. A method, comprising:
receiving, at a base station, a relative signal quality measurement report for a user equipment based on a determination of active and inactive subframes of a plurality of subframes that may be associated with a WLAN communication from the user equipment; and
receiving, at the base station, a modified relative signal quality measurement report of the relative signal quality measurement report, based on an estimate of an interference level caused by the WLAN communication on the active subframes, and the relative signal quality measurements for the active subframes,
wherein the relative signal quality measurement report comprises a measurement of at least one of a radio link monitoring parameter and a radio resource management parameter; and
allocating communication resources to the user equipment in response to the relative signal quality measurement report,
wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

11. The method according to claim 10, wherein at least one of the relative signal quality measurement report comprises one of:
an indication of a percentage of the active subframes with respect to the wireless local area network (WLAN) communication of the plurality of subframes; or
an indication that the relative signal quality measurements included in the relative signal quality measurement report are not valid; or
at least one of a reference signal received power measurement, a channel quality indicator, a reference signal received quality measurement, or a radio link monitoring parameter.

12. An apparatus, comprising:
at least one processor; and
at least one memory including computer program code;
the at least one memory and the computer program code are configured, with the at least one processor, to cause the apparatus at least to
receive a relative signal quality measurement report for a user equipment based on a determination of active and inactive subframes of a plurality of subframes that may be associated with a WLAN communication from the user equipment; and
receive a modified relative signal quality measurement report of the relative signal quality measurement report, based on an estimate of an interference level caused by the WLAN communication on the active subframes, and the relative signal quality measurements for the active subframes,
wherein the relative signal quality measurement report comprises a measurement of at least one of a radio link monitoring parameter and a radio resource management parameter; and
allocate communication resources to the user equipment in response to the relative signal quality measurement report,
wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

13. The apparatus according to claim 12, wherein at least one of the relative signal quality measurement report comprises one of:
an indication of a percentage of the active subframes with respect to the wireless local area network (WLAN) communication of the plurality of subframes; or an indication that the relative signal quality measurements included in the relative signal quality measurement report are not valid; or at least one of a reference signal received power measurement, a channel quality indicator, a reference signal received quality measurement, or a radio link monitoring parameter.

14. A computer program, embodied on a non-transitory computer readable medium, the computer program configured to control a processor to perform a process, the process comprising:

receiving a relative signal quality measurement report for a user equipment based on a determination of active and inactive subframes of a plurality of subframes that are associated with a WLAN communication from the user equipment; and receiving a modified relative signal quality measurement report of the relative signal quality measurement report, based on an estimate of an interference level caused by the WLAN communication on the active subframes, and the relative signal quality measurements for the active subframes, wherein the relative signal quality measurement report comprises a measurement of at least one of a radio link monitoring parameter and a radio resource management parameter; and allocating communication resources to the user equipment in response to the relative signal quality measurement report, wherein the modified relative signal quality measurement report comprises a percentage of the active subframes with respect to the wireless local area network (WLAN) communication of the plurality of subframes, or an indication that the relative signal quality measurements included in the modified relative signal quality measurement report are not valid.

* * * * *